United States Patent
Emura et al.

(10) Patent No.: US 9,204,050 B2
(45) Date of Patent: Dec. 1, 2015

(54) INFORMATION DISPLAYING APPARATUS AND INFORMATION DISPLAYING METHOD

(75) Inventors: Koichi Emura, Kanagawa (JP); Yasuaki Inatomi, Kanagawa (JP); Junko Ueda, Kanagawa (JP); Toshiki Kanehara, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 105 days.

(21) Appl. No.: 13/140,889

(22) PCT Filed: Dec. 22, 2009

(86) PCT No.: PCT/JP2009/007113
§ 371 (c)(1),
(2), (4) Date: Jun. 20, 2011

(87) PCT Pub. No.: WO2010/073616
PCT Pub. Date: Jul. 1, 2010

(65) Prior Publication Data
US 2011/0254861 A1   Oct. 20, 2011

(30) Foreign Application Priority Data
Dec. 25, 2008   (JP) ................................ 2008-331451

(51) Int. Cl.
*H04N 5/222*   (2006.01)
*H04N 5/232*   (2006.01)
(Continued)

(52) U.S. Cl.
CPC .......... *H04N 5/23293* (2013.01); *G06F 3/0488* (2013.01); *G06T 19/006* (2013.01);
(Continued)

(58) Field of Classification Search
CPC . G06F 3/0416; G06F 3/04842; G06F 3/0482; G06F 3/04817
See application file for complete search history.

(56) References Cited

U.S. PATENT DOCUMENTS

| 5,815,411 A | 9/1998 | Ellenby et al. |
| 6,037,936 A | 3/2000 | Ellenby et al. |

(Continued)

FOREIGN PATENT DOCUMENTS

| EP | 1024467 | 8/2000 |
| EP | 2154481 | 2/2010 |

(Continued)

OTHER PUBLICATIONS

International Search Report and/or Written Opinion in PCT/JP2008/007113, dated Apr. 6, 2010.
(Continued)

*Primary Examiner* — Maurice L McDowell, Jr.
*Assistant Examiner* — Raffi Isanians
(74) *Attorney, Agent, or Firm* — Greenblum & Bernstein, P.L.C.

(57) ABSTRACT

An information displaying apparatus is capable of providing an easy-to-see display of information that the user wants to know out of information related to objects seen in a captured real-world image. The information displaying apparatus comprises an image input unit for inputting a captured real-world image. A distance acquiring unit acquires the distance between an object seen in the input captured real-world image and a view point of the captured real-world image. An object superimposing unit outputs an image in which information related to the object is superimposed on the captured real-world image. An information output control unit controls the information output by the object superimposing unit. The information output control unit decides, in accordance with the acquired distance, how to present the information outputted by the object superimposing unit.

19 Claims, 21 Drawing Sheets

(51) Int. Cl.

| | | |
|---|---|---|
| *G06F 3/0488* | (2013.01) | |
| *H04N 5/445* | (2011.01) | |
| *G06T 19/00* | (2011.01) | |
| *H04N 21/422* | (2011.01) | |
| *H04N 21/4223* | (2011.01) | |
| *H04N 21/431* | (2011.01) | |
| *H04N 21/44* | (2011.01) | |
| *H04N 21/462* | (2011.01) | |
| *H04N 21/4725* | (2011.01) | |
| *H04N 21/414* | (2011.01) | |

(52) U.S. Cl.
CPC ....... *H04N5/23212* (2013.01); *H04N 5/23216* (2013.01); *H04N 5/445* (2013.01); *H04N 21/4223* (2013.01); *H04N 21/42202* (2013.01); *H04N 21/4316* (2013.01); *H04N 21/44008* (2013.01); *H04N 21/4622* (2013.01); *H04N 21/4725* (2013.01); *H04N 21/41407* (2013.01)

(56) References Cited

U.S. PATENT DOCUMENTS

| | | | |
|---|---|---|---|
| 8,103,126 B2 | 1/2012 | Hayashi | |
| 8,264,584 B2 * | 9/2012 | Mukai et al. | 348/333.02 |
| 2001/0041960 A1 * | 11/2001 | Hashida | 701/207 |
| 2002/0057280 A1 | 5/2002 | Anabuki et al. | |
| 2002/0109680 A1 * | 8/2002 | Orbanes et al. | 345/418 |
| 2003/0098863 A1 | 5/2003 | Fujita et al. | |
| 2004/0046779 A1 | 3/2004 | Asano et al. | |
| 2004/0070611 A1 | 4/2004 | Tanaka et al. | |
| 2007/0162942 A1 * | 7/2007 | Hamynen et al. | 725/105 |
| 2008/0136958 A1 | 6/2008 | Nakahara | |
| 2009/0278948 A1 | 11/2009 | Hayashi | |
| 2010/0125812 A1 * | 5/2010 | Hartman et al. | 715/848 |
| 2010/0149399 A1 | 6/2010 | Mukai et al. | |

FOREIGN PATENT DOCUMENTS

| | | |
|---|---|---|
| JP | 8-190640 | 7/1996 |
| JP | 09-505138 | 5/1997 |
| JP | 2000-194467 | 7/2000 |
| JP | 2000-512781 | 9/2000 |
| JP | 2002-163670 | 6/2002 |
| JP | 2003-167659 | 6/2003 |
| JP | 2004-048674 | 2/2004 |
| JP | 2004-178554 | 6/2004 |
| JP | 2005-207782 | 8/2005 |
| JP | 2006-155238 | 6/2006 |
| JP | 2007-272511 | 10/2007 |
| JP | 2008-193640 | 8/2008 |
| JP | 2009-271732 | 11/2009 |
| JP | 2010-118019 | 5/2010 |
| WO | 2008/149537 | 12/2008 |

OTHER PUBLICATIONS

Extended European Search Report from E.P.O. in European Application No. 09834424.5, mail date is Aug. 2, 2012.
English language translation of Search Report in Chinese Patent Application No. 200980150013.4, dated Apr. 18, 2014, which is an annex to an Office Action dated Apr. 30, 2014.

* cited by examiner

| 811 | 812 | 813 | 814 | 815 | 816 |
|---|---|---|---|---|---|
| ID | POSITION | LEVEL 1 | LEVEL 2 | LEVEL 3 | LEVEL 4 |
| 001 | LATITUDE: xxx1 LONGITUDE: xxx2 | B | X TOWER | EVENT FEATURING SNOWFALL IN ATRIUM NOW ON | SNOWFALL AT 13:00, 15:00, 17:00 PARKING AVAILABLE FREE PARKING AS FOLLOWS: 1 HOUR FOR PURCHASES OF 5,000 YEN OR MORE 2 HOURS FOR PURCHASES OF 10,000YEN OR MORE |
| 002 | LATITUDE: yyy1 LONGITUDE: yyy2 | B | Y SQUARE | YEAR-END SALE NOW ON | OPEN UNTIL 9 PM 12/10 THRU 1/3 PARKING AVAILABLE FREE PARKING AS FOLLOWS: 2 HOURS FOR PURCHASES OF 3,000 YEN OR MORE 3 HOURS FOR PURCHASES OF 5,000 YEN OR MORE |
| 003 | LATITUDE: zzz1 LONGITUDE: zzz2 | H | Z HOTEL | YEAR-END DINNER SHOW | VACANCIES SINGLE: FROM 8,000 YEN TWIN: FROM 15,000 yenYEN |
| ... | ... | ... | ... | ... | |

| OBJECT DISTANCE | 400 m OR MORE OR LESS THAN 20 m | 300 m OR MORE AND LESS THAN 400 m | 200 m OR MORE AND LESS THAN 300 m | 100 m OR MORE AND LESS THAN 200 m | LESS THAN 100 m AND 20 m OR MORE |
|---|---|---|---|---|---|
| DECISION CONTENTS | NON-DISPLAY | LEVEL 1 | LEVEL 2 | LEVEL 3 | LEVEL 4 |

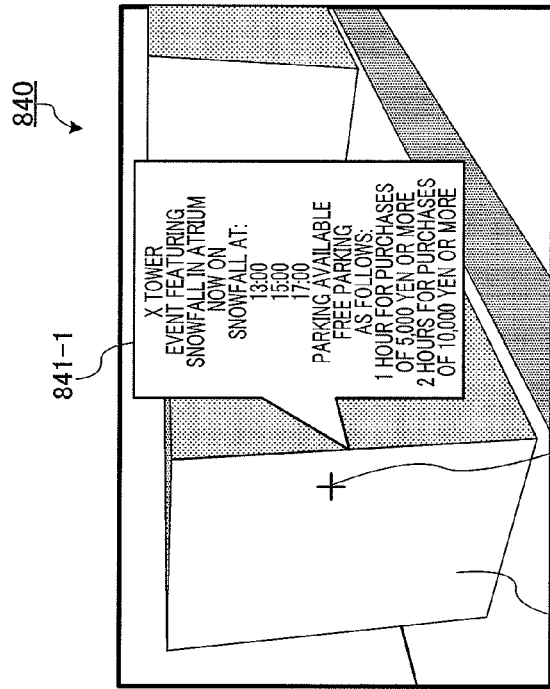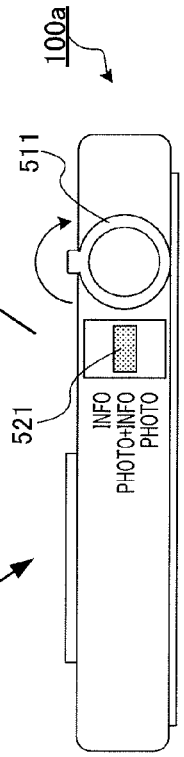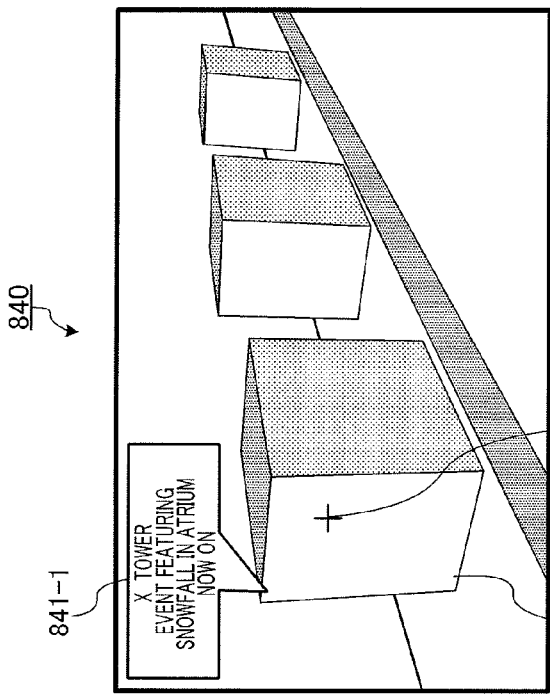

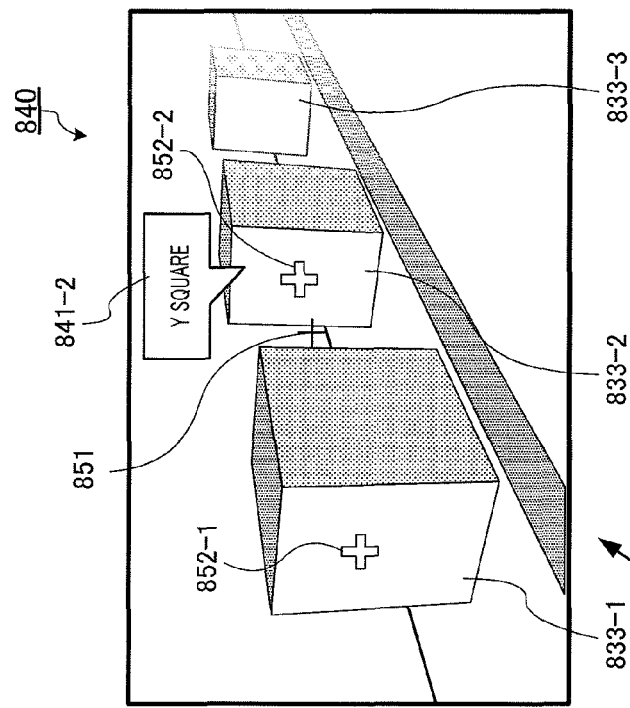
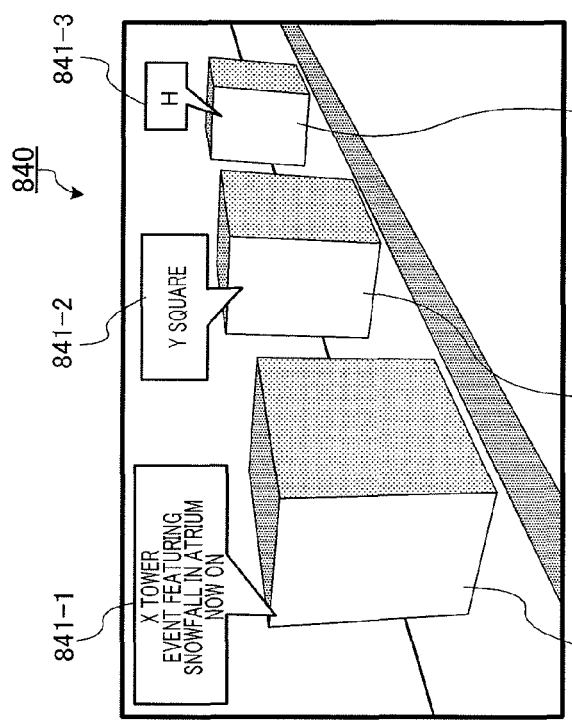
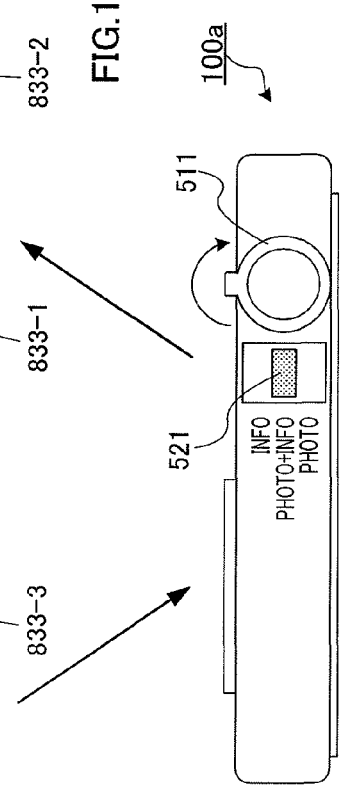
FIG.16A
FIG.16B
FIG.16C

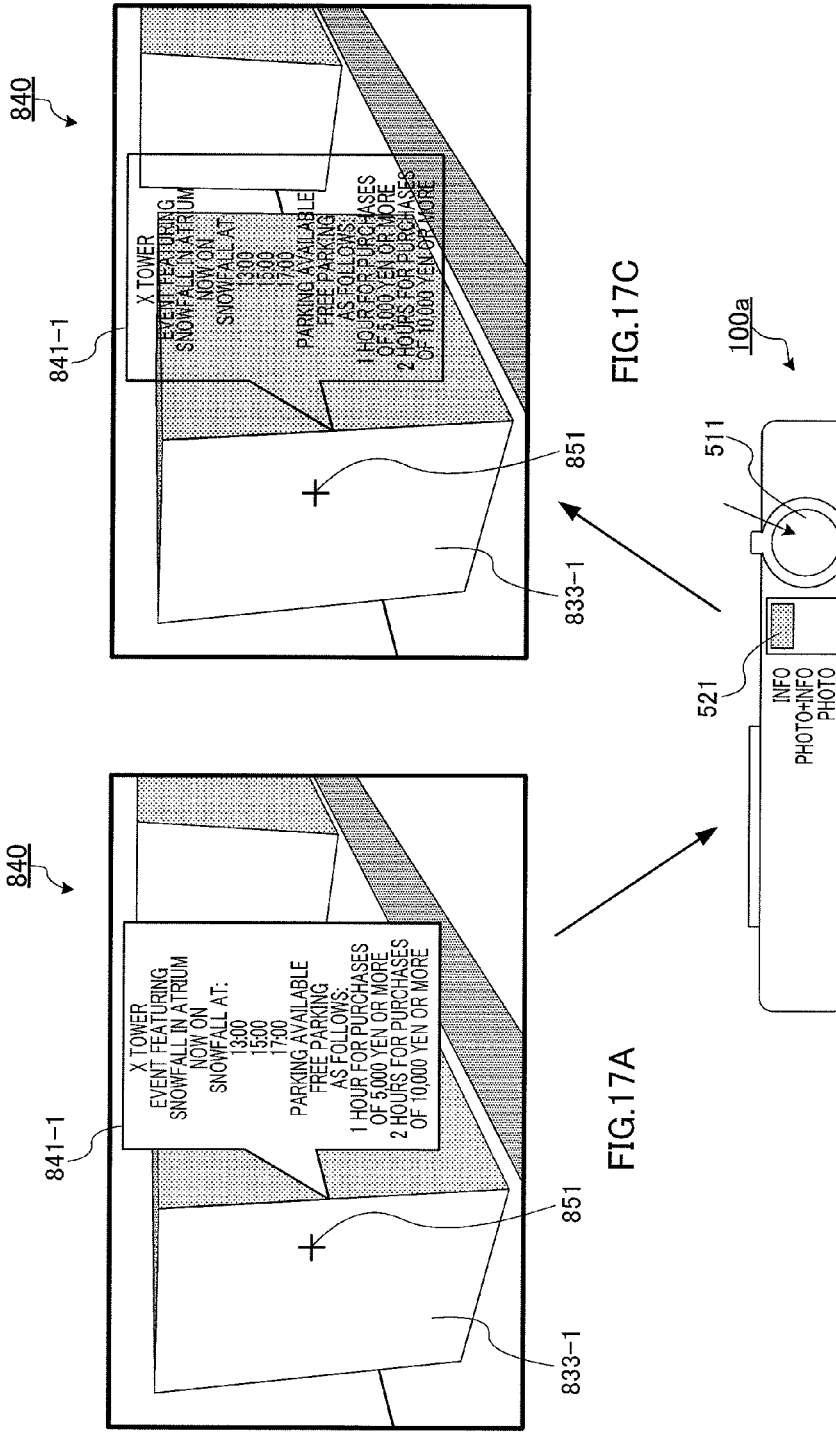

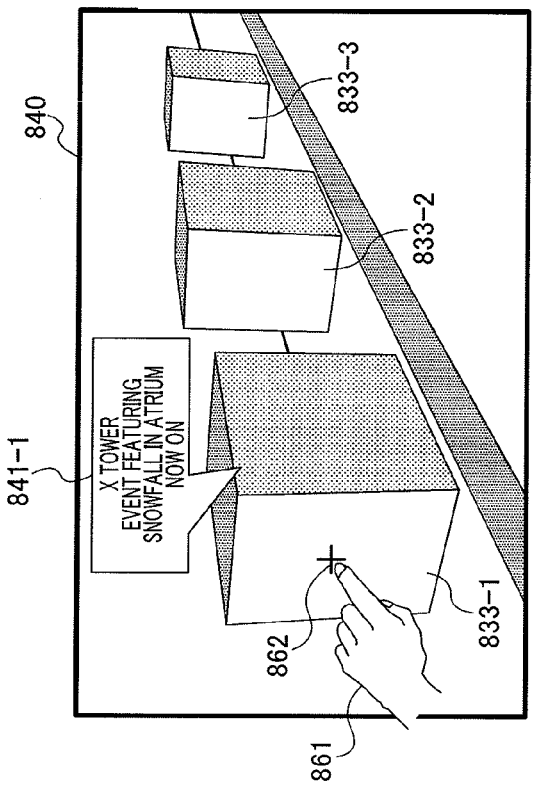
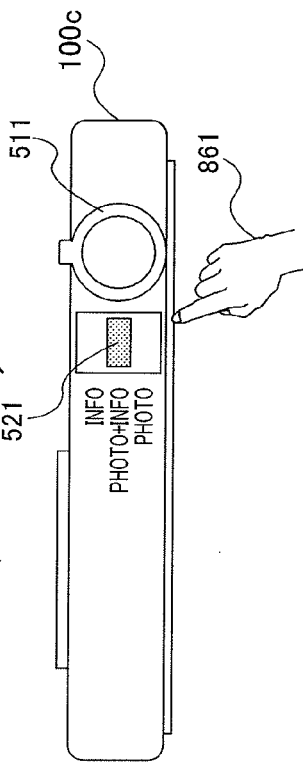
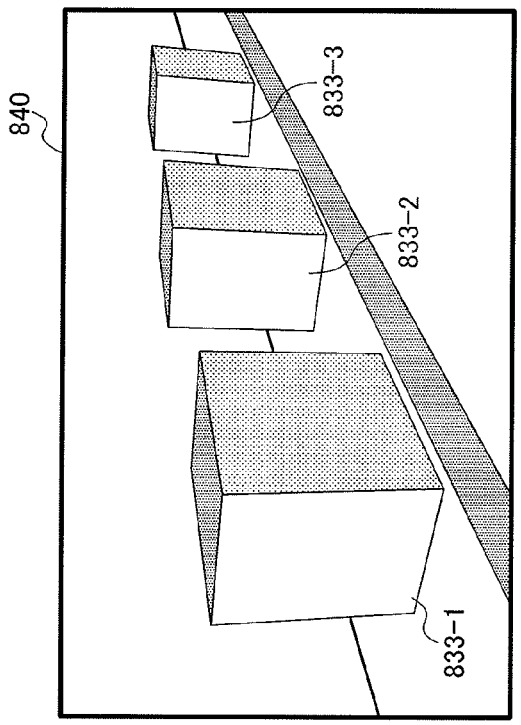

| ID 811 | POSITION 812 | EFFECTIVE TIME 817d | LEVEL 1 813 | LEVEL 2 814 | LEVEL 3 815 | LEVEL 4 816 |
|---|---|---|---|---|---|---|
| 101 | LATITUDE: xx1 LONGITUDE: yy1 | 2009/11/4 8:30 | TRAIN PROBLEMS, NOT MOVING | FROM A LINE TO B EXPRESS FROM CR TO SUBWAY D LINE | BIG CROWDS STATION E TO STATION F, TOOK 30 MINUTES | CONGESTION MAP: www.kzt.jp |
| 102 | LATITUDE: xx1 LONGITUDE: yy1 | 2009/11/4 20:30 | LIVE PERFORMANCE | STARTING AT 00 PM OPEN-AIR AUDITORIUM | PERFORMERS: A, B, C GUEST: D | DETAILS LINK: www.foo.jp |
| ... | ... | ... | ... | ... | ... | ... |

INFORMATION DISPLAYING APPARATUS AND INFORMATION DISPLAYING METHOD

TECHNICAL FIELD

The present invention relates to an information displaying apparatus and information displaying method that displays the information relating to an object shown in a captured real-world image, superimposed on the captured real-world image.

BACKGROUND ART

Various kinds of objects such as facilities or the like are seen in a captured real-world image such as a photographic image of a scene. Image display apparatuses that display a captured real-world image and information relating to an object (hereinafter "object information") seen in that captured real-world image in a single screen, in superimposed manner, are used in various fields. Such technology is called "augmented reality," and is also referred to as "enhanced reality" and so forth. An augmented reality apparatus in which this technology is applied is useful for acquiring information on an ad-hoc basis while moving.

Technology that controls object information to be displayed by an apparatus that displays object information (hereinafter referred to simply as "information displaying apparatus") superimposed on a captured real-world image is described in Patent Literature 1 and Patent Literature 2, for example.

FIG. 1 is a drawing showing the configuration of an information displaying apparatus described in Patent Literature 1. FIG. 2 is a drawing showing an example of a captured real-world image input by an information displaying apparatus described in Patent Literature 1. FIG. 3 is a drawing showing an example of an image in which object information is superimposed on a captured real-world image, displayed in correspondence to the input image shown in FIG. 2 by the information displaying apparatus shown in FIG. 1 (hereinafter referred to as "information superimposed image").

As shown in FIG. 2, independent marker 12 for identifying object 11 is placed near that object in advance.

In FIG. 1, information displaying apparatus 20 has image input section 21 that receives as input a captured real-world image, marker extraction section 22 that extracts marker 12 from an input image, and marker recognition section 23 that computes the position and orientation of the extracted marker 12. In addition, information displaying apparatus 20 has related information acquisition section 24 that acquires object information relating to marker 12 in advance, model data creation section 25 that creates a graphical model data that indicates object information, and display section 26 that makes a graphical model data superimposed on side of a corresponding real-world object of an input image. As a result, image 33 shown in FIG. 3 is displayed, in which object information 32 corresponding to object 11 is displayed superimposed on captured real-world image 31 that includes an image of object 11.

Model data creation section 25 of an information displaying apparatus described in Patent Literature 1 changes the drawing position of displayed information in synchronization with a change of input image, and causes this drawing position to follow the display position of an object. Therefore, for example, an information displaying apparatus described in Patent Literature 1 can display information accurately synchronized with movement of an input image viewpoint (camera user movement) even when a user take a photo or shoot a video while the periphery of a sample is revolving.

FIG. 4 is a drawing showing the configuration of an information displaying apparatus described in Patent Literature 2. In FIG. 4, information displaying apparatus 40 has viewpoint position detection section 41 that detects a position of a user's viewpoint, display position detection section 42 that detects a position of display 47, and object position detection section 43 that detects a position of an object that is seen. Information displaying apparatus 40 also has object identification section 44 that identifies an object that is positioned on a line joining a user viewpoint and the center position of display 47, and object information search section 45 that acquires object information from a storage apparatus. In addition, information displaying apparatus 40 has image generation section 46 that selects a level of detail of displayed reference information according to the distance between a user viewpoint and display 47. As a result, when a user viewpoint comes close to the display, more detailed information is displayed.

CITATION LIST

Patent Literature

PTL 1
Japanese Patent Application Laid-Open No. 2004-48674
PTL 2
Japanese Patent Application Laid-Open No. HEIR-190640

SUMMARY OF INVENTION

Technical Problem

However, a problem with the technologies described in Patent Literature 1 and Patent Literature 2 is that information that a user wants to know cannot be displayed in an easy-to-see fashion.

With an information displaying apparatus described in Patent Literature 1, for example, if there are a plurality of objects for which a marker is placed in a captured real-world image, the amount of displayed information is large, and not only does the information become complicated, but also the captured real-world image becomes difficult to see.

With an information displaying apparatus described in Patent Literature 2, objects that are subject to information display can be limited, but if a degree of attention toward an object does not correspond to a degree of proximity of a user viewpoint to the display, an excess or deficiency of information may occur.

It is therefore an object of the present invention to provide an information displaying apparatus and information displaying method that can provide an easy-to-see display of information that a user wants to know from among information relating to objects shown in a captured real-world image.

Solution to Problem

An information displaying apparatus of the present invention has: an image input section that receives as input a captured real-world image; a distance acquisition section that acquires a distance between an object shown in the input captured real-world image and a viewpoint of the captured real-world image; an object superimposition section that outputs an image in which information relating to the object is superimposed on the captured real-world image; and an information output control section that controls the information displayed by the object superimposition section, and, with this information displaying apparatus, the information output control section decides a way of presenting the information output from the object superimposition section, according to the acquired distance.

An information displaying method of the present invention has the steps of: receiving as input a captured real-world image; acquiring a distance between an object shown in the input captured real-world image and a viewpoint of the captured real-world image; deciding a way of presenting information relating to the object according to the acquired distance; and outputting the information superimposed on the captured real-world image so as to be presented in the decided way of presenting.

Advantageous Effects of Invention

According to the present invention, information relating to an object is presented in a way that is in accordance with the distance between the viewpoint of a captured real-world image and the object, thereby making it possible to provide an easy-to-see display of information that a user wants to know from among information relating to objects.

BRIEF DESCRIPTION OF DRAWINGS

FIG. 7 is a drawing showing an example of the contents of an object information table in Embodiment 1;

FIG. 8 is a drawing showing an example of the contents of display information decision rules in Embodiment 1;

FIG. 15 is a drawing showing an example of change in a display image when a zoom operation is performed in Photo+ Info mode in Embodiment 2;

FIG. 16 is a drawing showing an example of change in a display image when an aperture operation is performed in Photo+Info mode in Embodiment 2;

FIG. 17 is a drawing showing an example of change in a display image when a focus lock operation is performed in Info mode;

FIG. 20 is a drawing showing an example of change in a display image when a touch operation is performed in Photo+ Info mode in Embodiment 4;

FIG. 22 is a drawing showing an example of the contents of an object information table in Embodiment 5.

DESCRIPTION OF EMBODIMENTS

Now, embodiments of the present invention will be described in detail with reference to the accompanying drawings.

Embodiment 1

Embodiment 1 of the present invention is an example in which the present invention is applied to a digital still camera that stands by for a shooting operation while displaying a captured real-world image. First, an overview of the operating interface of an information displaying apparatus according to Embodiment 1 will be given.

Figure 1:
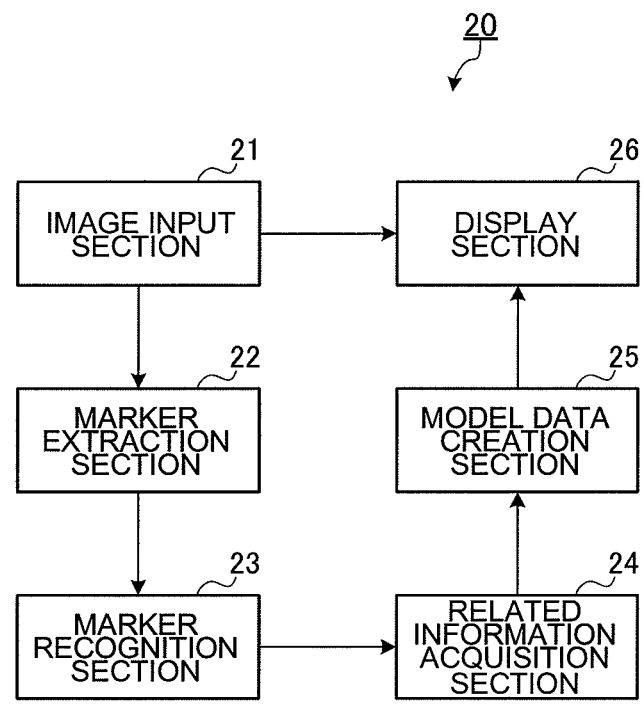
FIG. 1 is a first drawing showing a configuration of a conventional information displaying apparatus.
Figure 2:
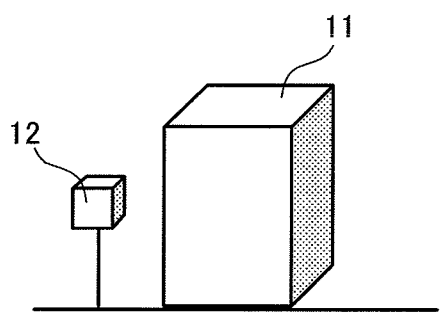
FIG. 2 is a drawing showing an example of an input image of a conventional information displaying apparatus.
Figure 3:
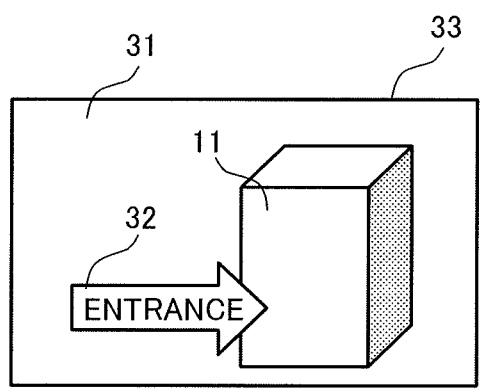
FIG. 3 is a drawing showing an example of an information superimposed image of a conventional information displaying apparatus.
Figure 4:
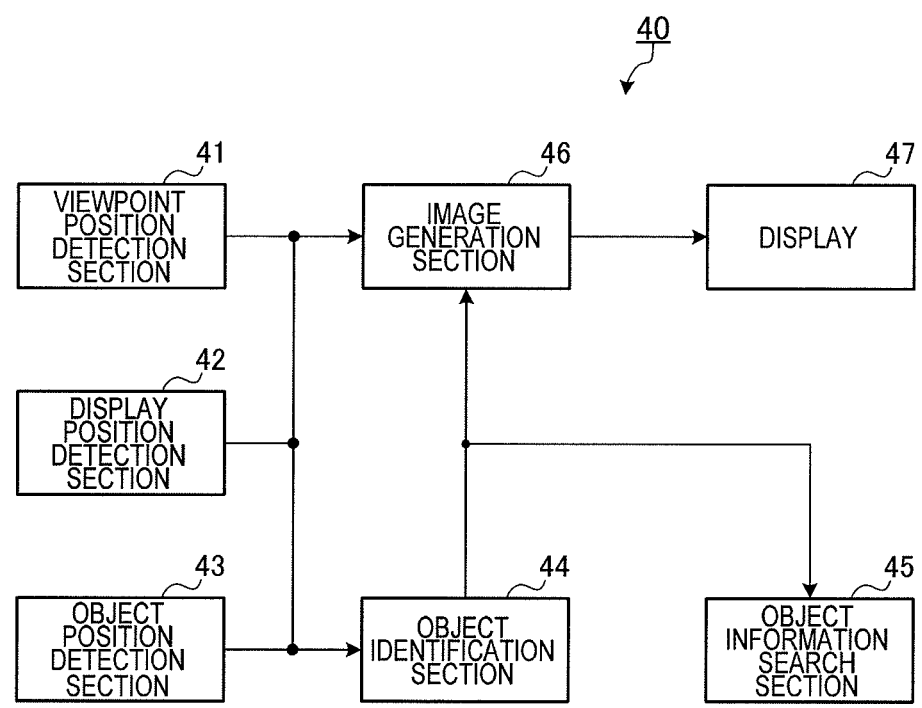
FIG. 4 is a second drawing showing a configuration of a conventional information displaying apparatus.
Figure 5:
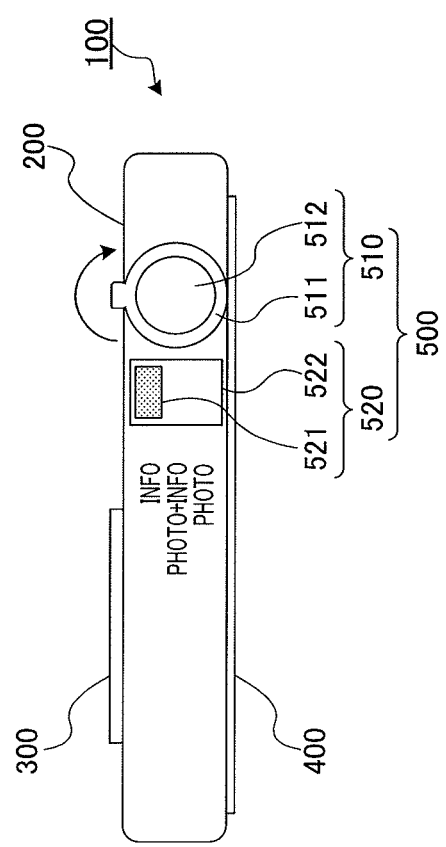
FIG. 5 is an external view of an information displaying apparatus according to Embodiment 1 of the present invention.

FIG. 5 is an external view of an information displaying apparatus according to this embodiment. FIG. 5 is a plan view from above of an information displaying apparatus in an operational state.

In FIG. 5, information displaying apparatus 100 has body section 200 comprising a slim rectangular casing, and image input section 300, image display section 400, and operating interface section 500, positioned on the outside of body section 200. Operating interface section 500 has operation input section 510 and mode switchover input section 520.

Image input section 300 has a lens, shutter, and imaging element (none of which is shown), and receives as input a captured real-world image. Image input section 300 has a configuration allowing focusing, aperture, and zoom operations.

Image display section 400 has, for example, a liquid crystal display (not shown), and displays image.

Body section 200 captures a real-world image input by image input section 300 and displays the image on display section 400. Also, body section 200 displays on image display section 400 an information superimposed image in which information on an object shown in a captured real-world image is superimposed on that captured real-world image. At this time, body section 200 acquires the distance between the captured real-world image viewpoint (position of information displaying apparatus 100) and the object, and decides a way of presenting object information to be displayed, according to the acquired distance.

Operation input section 510 receives a user operation, and reflects the received user operation in a captured real-world image input by body section 200 and displayed object information. Operation input section 510 has lever 511 and button 512. Lever 511 is a knob that can be rotated in an arc about button 512. Button 512 can be pressed in two stages: half-press and full press.

Mode switchover input section 520 has switch 521, and sliding section 522 that allows switch 521 to slide between three latching positions, and receives switching operations by the user corresponding to three modes in which the operation of body section 200 differs. In this embodiment, the first mode is a mode in which only a captured real-world image is displayed (hereinafter referred to as "Photo mode"); the second mode is a mode in which only object information is displayed (hereinafter referred to as "Info mode"); and the third mode is a mode in which an image in which object information is superimposed on a captured real-world image is displayed (hereinafter referred to as "Photo+Info mode").

The configuration of information displaying apparatus 100 will now be described.

Figure 6:
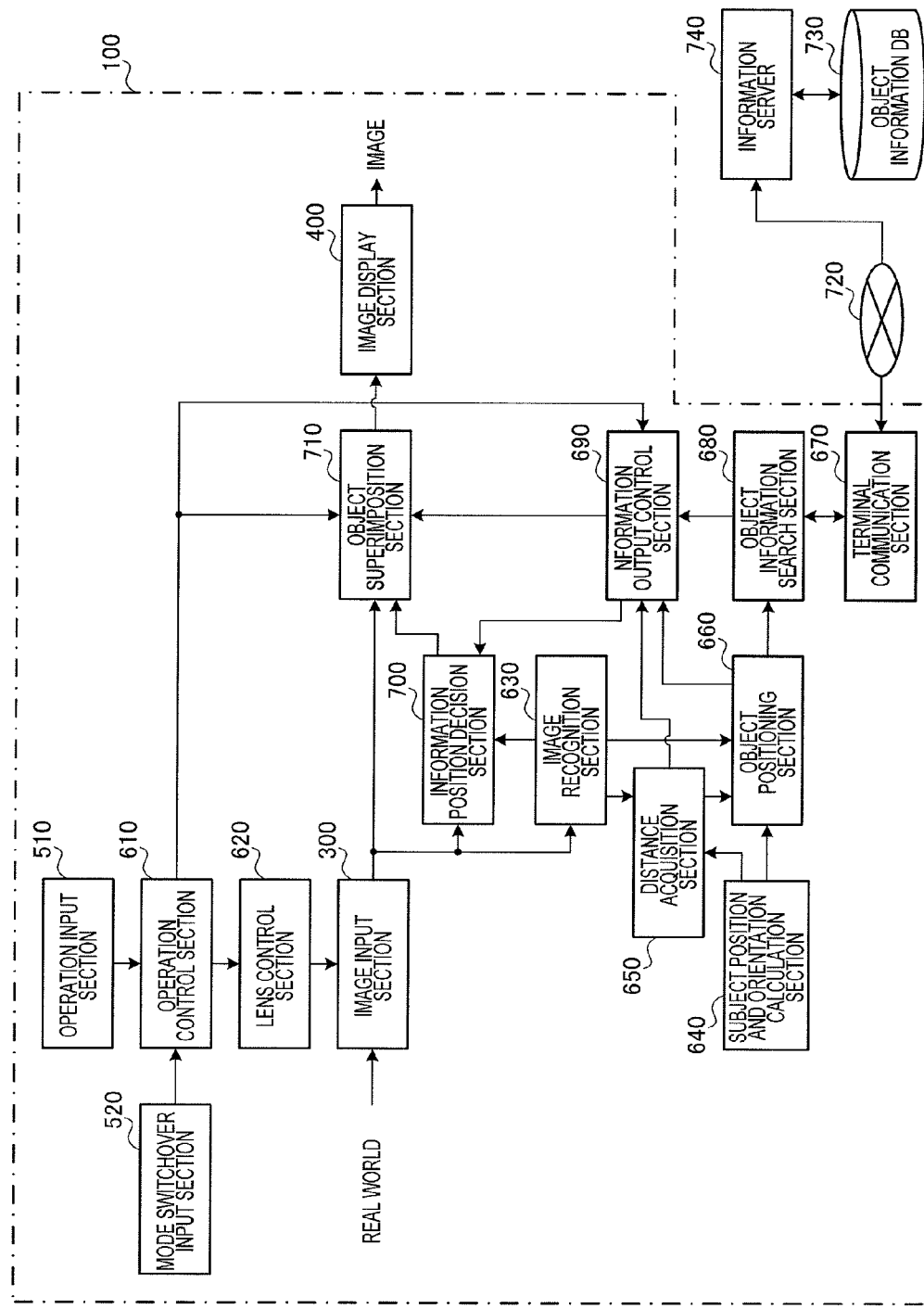
FIG. 6 is a block diagram showing the configuration of an information displaying apparatus according to Embodiment 1.

FIG. 6 is a block diagram showing the configuration of information displaying apparatus 100. Parts in FIG. 6 identical to those in FIG. 5 are assigned the same reference codes as in FIG. 5, and descriptions thereof are omitted here where appropriate.

In FIG. 6, information displaying apparatus 100 has operation input section 510, mode switchover input section 520, operation control section 610, lens control section 620, image input section 300, image recognition section 630, subject position and orientation calculation section 640, distance acquisition section 650, object positioning section 660, terminal communication section 670, object information search section 680, information output control section 690, information position decision section 700, object superimposition section 710, and image display section 400.

Operation input section 510 outputs information indicating the contents of a user operation (hereinafter referred to as "operation information") to operation control section 610.

Mode switchover input section 520 outputs information indicating a set mode (hereinafter referred to as "mode information") to operation control section 610.

Operation control section 610 controls the operation of lens control section 620, information output control section 690, and object superimposition section 710 according to input mode information.

Specifically, in Photo mode, operation control section 610 outputs operation information to lens control section 620, but stops the operation of information output control section 690 for object superimposition section 710 to display only captured real-world image; in Photo+Info mode, operation control section 610 outputs operation information to lens control section 620, and operates information output control section 690 for object superimposition section 710 to display information superimposed image; and in Info mode, operation control section 610 stops the operation of lens control section 620, and stops the operation of information output control section 690 for object superimposition section 710 to display fixed display of an information superimposed image.

Lens control section 620 controls the lens of image input section 300. Specifically, lens control section 620 controls the zoom factor, focus position, and aperture value of a captured real-world image input by image input section 300, according to input operation information.

Image input section 300 outputs an input captured real-world image (hereinafter referred to as "input image") to image recognition section 630, information position decision section 700, and object superimposition section 710. Also, image input section 300 outputs information indicating the focal point of the lens (hereinafter referred to as "focus point") to image recognition section 630 and object superimposition section 710.

Image recognition section 630 recognizes an object shown in an input image. Specifically, image recognition section 630 performs image recognition processing such as pattern matching processing on an input image, and extracts an area in the input image in which an object such as a building or sign is seen (hereinafter referred to as "object area"). Then image recognition section 630 outputs information indicating the position of the extracted object area in the input image (hereinafter referred to as "area information") to distance acquisition section 650, object positioning section 660, and information position decision section 700.

If there are a plurality of object areas, it is desirable for image recognition section 630 to add identification information to each item of area information, and output this information, in order to perform subsequent processing for each object.

Subject position and orientation calculation section 640 calculates the position and orientation of information displaying apparatus 100 at a point in time at which a captured real-world image is input. Specifically, subject position and orientation calculation section 640 calculates the viewpoint position and optical axis direction of image input section 300 using an angular velocity sensor and GPS (global positioning system) sensor or the like. Then subject position and orientation calculation section 640 outputs the calculation results (hereinafter referred to as "position and orientation information") to distance acquisition section 650 and object positioning section 660.

Distance acquisition section 650 acquires a horizontal distance from an input image viewpoint to an object recognized by image recognition section 630 (hereinafter referred to as "object distance").

Specifically, distance acquisition section 650 uses a laser ranging sensor or the like to measure the actual distance from image recognition section 630 to each object corresponding to area information of each object. Then distance acquisition section 650 converts a measured actual distance to a horizontal distance based on the angle of elevation of the direction of an object calculated from position and orientation information, and outputs this to object positioning section 660 and information output control section 690 as an object distance. Depending on the particular use of the apparatus, such as use in a region where the ground is significantly inclined, an actual distance rather than a horizontal distance may be utilized as an object distance.

Object positioning section 660 acquires position and orientation information from subject position and orientation calculation section 640, area information from image recognition section 630, and an object distance from distance acquisition section 650. Then object positioning section 660 measures the position in a captured real-world image of an object shown in an input image (hereinafter referred to simply as "object position") from the acquired information. Furthermore, object positioning section 660 outputs information indicating the measurement result by means of latitude and longitude (hereinafter referred to as "latitude and longitude information") to object information search section 680 and information output control section 690.

Terminal communication section 670 communicates with information server 740 provided with object information database (DB) 730, via communication network 720 such as the Internet. Object information database 730 stores in advance an object information table in which various kinds of object information are stored for each item of object information, associated with an object position.

FIG. 7 is a drawing showing an example of the contents of an object information table stored by object information database 730.

As shown in FIG. 7, object information table 810 contains object information 813 through 816 of level 1 through level 4 having different levels of detail, associated with object ID 811 and object position 812. Using position 812 as an index, above-mentioned information server 740 can acquire corresponding object information table 810 and level 1 through level 4 object information 813 through 816 from object information table 810.

Level 1 object information 813 is a symbol indicating a type of facility. Level 2 object information 814 is a name of a facility. Level 3 object information 815 is topic information concerning a facility. And level 4 object information 816 is detailed information concerning a facility. That is to say, level 1 through level 4 object information 813 through 816 present successively higher levels of detail in that order.

For example, "B" and "X Tower" are associated, as type of facility and name of facility, respectively, with an object present at position "latitude: xxx1, longitude: xxx2." In addition, topic information and detailed information are also associated with the object present at position "latitude: xxx1, longitude: xxx2." Specifically, "Event featuring snowfall in atrium now on" is associated with this object as topic information, and "Snowfall at 13:00, 15:00, 17:00 . . . " as detailed information. Therefore, when latitude and longitude information "latitude: xxx1, longitude: xxx2" is used as a search key, these items of object information are retrieved.

Object information search section 680 in FIG. 6 searches for object information using latitude and longitude information indicating the position of an object as a search key.

Specifically, object information search section 680 transmits input latitude and longitude information to information server 740, via terminal communication section 670, as an object information database 730 search query. Then object information search section 680 outputs object information sent back from information server 740 to information output control section 690. Object information sent back here is assumed to be all of level 1 through level 4 object information 813 through 816. If information displaying apparatus 100 decides in advance a level of detail of object information to be displayed, provision may be made for object information search section 680 to search for and acquire only that level of object information.

Information output control section 690 controls the way of presenting object information according to the object distance.

Specifically, information output control section 690 stores display information decision rules in advance, and decides object information relating to an object to be displayed, and object information with different amounts of information to be displayed, in accordance with these display information decision rules. That is to say, information output control section 690 decides an object and a degree of the amount of information as display objects. Then information output control section 690 outputs object information for which display has been decided (hereinafter referred to as "display object information") to information position decision section 700 and object superimposition section 710. Here, the display information decision rules are assumed to stipulate that, the shorter the object distance of an object, the higher is the level of detail of object information decided upon as a display object.

FIG. 8 is a drawing showing an example of the contents of display information decision rules.

As shown in FIG. 8, display information decision rules 820 stipulate object information display/non-display, and in the case of display, an object information level, as decision contents 822 for various object distance 821 ranges. For example, for object distance 821 "300 m or more and less than 400 m," decision contents 822 "Level 1" are stipulated. This means that if an object distance is 300 m or more and less than 400 m, level 1 object information (here, a symbol indicating a type of facility) is decided upon as display object information. Also, the shorter object distance 821 is within a certain range, the higher is the level of detail of associated object information. Therefore, following display information decision rules 820 provides for displayed object information to become more detailed the shorter the object distance is.

Information position decision section 700 in FIG. 6 detects the depth direction of an input image, and decides a display position of each item of display object information so as to be aligned in the detected depth direction. Next, information position decision section 700 outputs the decision results (hereinafter referred to as "display layout information") to object superimposition section 710. Specifically, information position decision section 700 detects a vanishing point from linear components included in the input image. Then, based on the vanishing point, area information, and display object information, information position decision section 700 decides the display position of each item of display object information so as to be on a perspective line that extends radially from the vanishing point, and so as not to overlap an object area.

Provision may also be made for information position decision section 700 to decide the display position of each item of display object information so as to follow a line joining the edges of a plurality of object areas. By this means, information position decision section 700 can easily decide the display position of each item of display object information so as not to overlap an object area, and in a state in which association with real-world positional relationships of objects is provided.

Object superimposition section 710 generates image data that displays an information superimposed image in which display object information is positioned in a position indicated by display layout information in the input image, and outputs the generated image data to image display section 400. Specifically, in Photo mode, object superimposition section 710 generates image data that displays only the input image, and in Info mode or Photo+Info mode, object superimposition section 710 generates image data that displays an information superimposed image.

Image display section 400 converts the image data generated by object superimposition section 710 to an image, and displays this image on the liquid crystal display.

Information displaying apparatus 100 has, for example, a CPU (central processing unit), a storage medium such as ROM (read only memory) that stores a control program, working memory such as RAM (random access memory), and so forth. In this case, the functions of the above sections are implemented by execution of the control program by the CPU.

According to information displaying apparatus 100 of this kind, information relating to an object can be displayed superimposed on an input image using a way of presenting information that is in accordance with the distance between the input image viewpoint and the object.

The operation of information displaying apparatus 100 having the above-described configuration will now be described. Here, operation in Photo+Info mode will be described.

Figure 9:
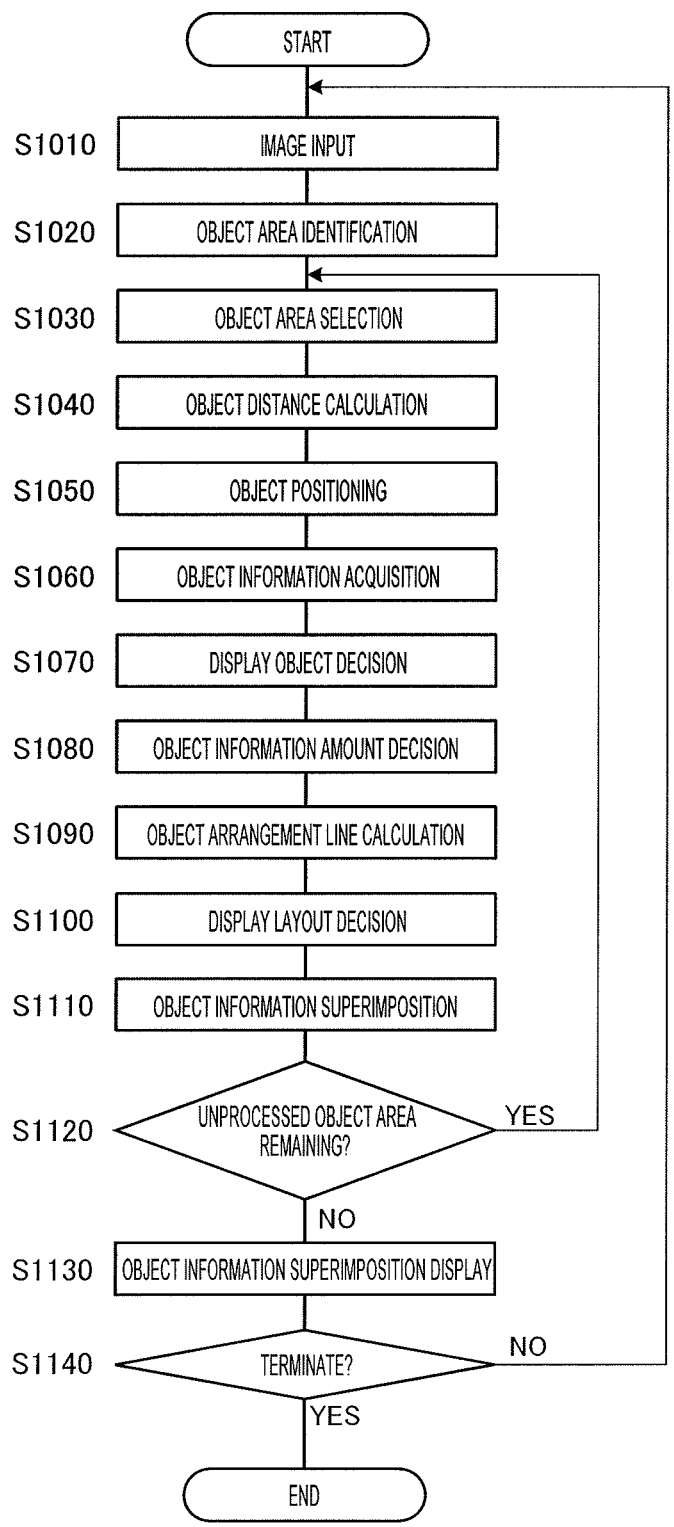
FIG. 9 is a flowchart showing the operation of an information displaying apparatus according to Embodiment 1.

FIG. 9 is a flowchart showing the operation of information displaying apparatus 100.

First, in step S1010, image input section 300 inputs a captured real-world image, and sends the input image to image recognition section 630, information position decision section 700, and object superimposition section 710.

Figure 10:
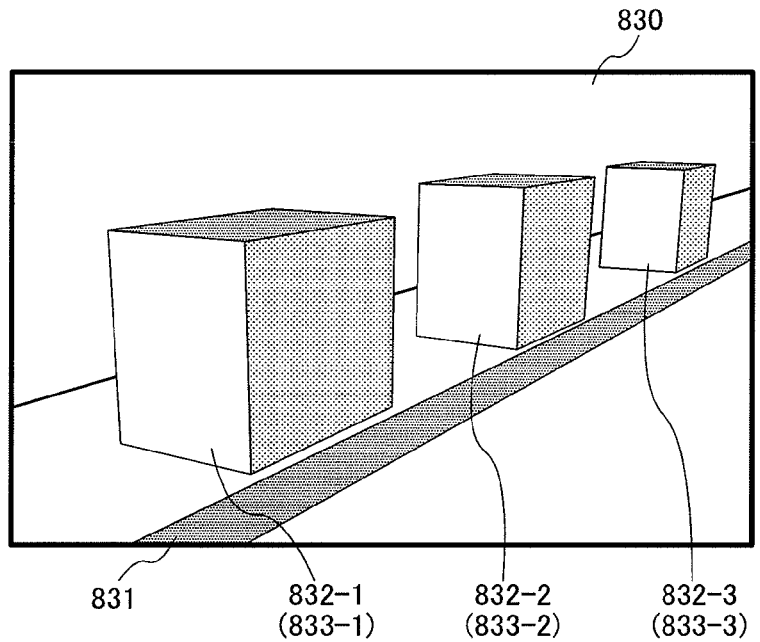
FIG. 10 is a drawing showing an example of an input image in Embodiment 1.

FIG. 10 is a drawing showing an example of an input image input by image input section 300. Here, as shown in FIG. 10, it is assumed that first through third objects 832-1 through 832-3 are seen in image display apparatus 830, positioned in order from the front along road 831. First through third objects 832-1 through 832-3 are buildings of different facilities.

Then, in step S1020 in FIG. 9, image recognition section 630 extracts and identifies one or more object areas from the input image. For example, from input image 830 shown in FIG. 10, image recognition section 630 extracts and identifies first through third object areas 833-1 through 833-3 as object areas of first through third objects 832-1 through 832-3, respectively. Then image recognition section 630 selects all or any of the identified object areas as a processing object.

For example, within a preset range of threshold values, image recognition section 630 preferentially selects an object area with a high recognition rate, or selects only an object area in focus and object areas within a certain range in front of and behind that object area. A recognition rate is an indicator showing the likelihood of an object area based on an object area characteristic in order to perform processing according to priority, rather than based on uniform treatment, when, for example, a hundred object areas are selected in one image. An object area characteristic is, for example, the steepness of the gradient of pixel values of the boundary between a background and object, the size (planar dimension) of an area enclosed by an edge with a high pixel value within an object area, or the like. Limiting object areas that are actually made processing objects in this way enables the subsequent processing load to be reduced.

Then, in step S1030, image recognition section 630 selects one object area from among the object areas selected as processing objects. Then image recognition section 630 sends area information of the selected object area to distance acquisition section 650, object positioning section 660, and information position decision section 700.

Then, in step S1040, distance acquisition section 650 calculates the object distance of the selected object based on information input from subject position and orientation calculation section 640 and image recognition section 630. Then distance acquisition section 650 sends the calculated object distance to object positioning section 660 and information output control section 690.

Specifically, subject position and orientation calculation section 640 first generates a viewpoint position and optical axis direction of image input section 300 calculated using an angular velocity sensor, GPS sensor, or the like, as position and orientation information, and sends this information to distance acquisition section 650 and object positioning section 660. Then distance acquisition section 650 measures an actual distance to each object based on area information from image recognition section 630, using a laser ranging sensor or the like. Then distance acquisition section 650 converts a measured actual distance to a horizontal distance based on the angle of elevation of the direction of an object calculated from position and orientation information, and outputs this as an object distance.

Then, in step S1050, object positioning section 660 calculates the position of an object corresponding to an object area using position and orientation information, the direction of the object direction calculated from position and orientation information, and the object distance. Next, object positioning section 660 sends latitude and longitude information for the calculated object position to object information search section 680 and information output control section 690.

Then, in step S1060, object information search section 680 sends a search query with latitude and longitude information as a search key to information server 740, and acquires corresponding object information. Then object information search section 680 sends the acquired object information to object information search section 680.

Then, in step S1070, information output control section 690 decides an object that is to be displayed (hereinafter referred to as "display object"). For example, information output control section 690 decides upon objects corresponding to all acquired object information or an object corresponding to an object area in focus, an object corresponding to an object area included in that peripheral range, or the like. Also, if an attribute (such as "hotel," "department store," or the like) of an object that is to be a display object has been specified, for example, information output control section 690 may decide upon an object corresponding to the specified attribute as a display object.

Then, in step S1080, information output control section 690 uses the above-described display information decision rules to decide an amount of information in such a way that the level of detail is higher the shorter the object distance. The amount of information decided here is the amount of information when object information of a display object is presented.

Then information output control section 690 sends the decided display object and object information corresponding to the decided amount of information to information position decision section 700 and object superimposition section 710 as display object information.

Then, in step S1090, information position decision section 700 calculates a line segment representing depth of the input image from an arrangement pattern of a plurality of object areas and linear components included in the input image.

Then, in step S1100, information position decision section 700 decides the display layout based on the line segment calculated in step S1090, and sends display layout information to object superimposition section 710.

Then, in step S1110, object superimposition section 710 generates image data of an information superimposed image in which display object information is arranged in accordance with the display layout information.

Then, in step S1120, image recognition section 630 determines whether or not an unprocessed object area remains from among the object areas selected as processing objects in step S1020. If an unprocessed object area remains (S1120: YES), image recognition section 630 returns to step S1030, selects an unprocessed object area, and executes the processing in steps S1030 through S1110. If, as a result, there are a plurality of items of display object information, in step S1110 image data in which a plurality of items of display object information are superimposed is generated. If no unprocessed object area remains (S1120: NO), image recognition section 630 proceeds to step S1130.

In step S1130, object superimposition section 710 outputs the generated image data to image display section 400, and has an information superimposed image to be displayed.

Then, in step S1140, information displaying apparatus 100 determines whether or not stoppage of information superimposed image display has been specified by a user operation or the like (for example, an operation whereby Photo mode is switched to or the like). If stoppage of information superimposed image display has not been specified (S1140: NO), information displaying apparatus 100 returns to step S1010, whereas if stoppage of information superimposed image display has been specified (S1140: YES), information displaying apparatus 100 terminates the series of processing steps.

Figure 11:
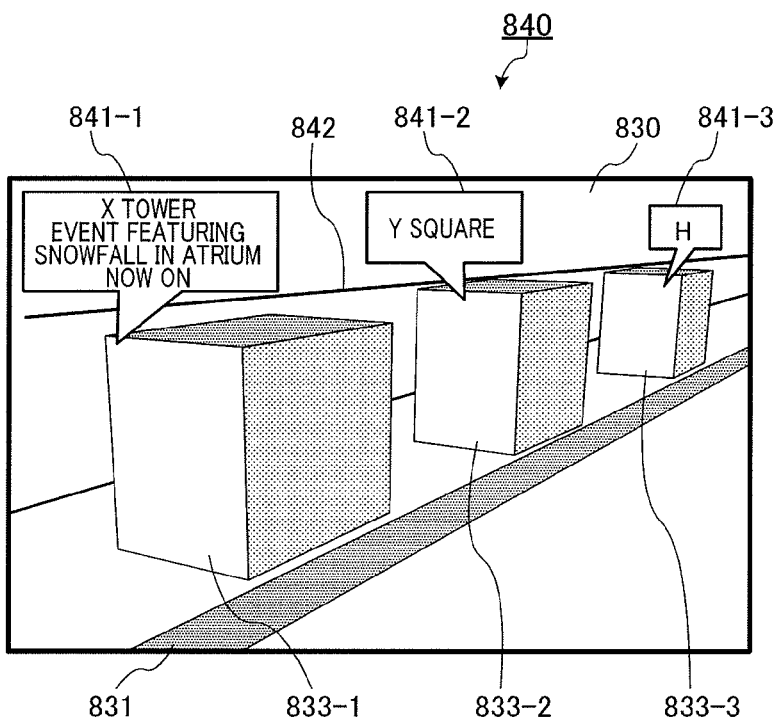
FIG. 11 is a drawing showing an example of an information superimposed image in Embodiment 1.

FIG. 11 is a drawing showing an example of an information superimposed image displayed by image display section 400. Here, an information superimposed image is shown that is displayed according to the input image shown in FIG. 10, based on object information table 810 shown in FIG. 7 and display information decision rules 820 shown in FIG. 8. First through third objects 832-1 through 832-3 shown in FIG. 10 are assumed to be objects corresponding to ID "001," ID "002," and ID "003," shown in FIG. 7.

Here, it is assumed that the distances of first through third objects 832-1 through 832-3 are 150 m, 250 m, and 350 m, respectively. In this case, level 3 (topic information), level 2 (facility name), and level 1 (symbol indicating type of facility) object information levels are decided upon, respectively, for first through third object areas 833-1 through 833-3. Then ID "001" level 3 object information, ID "002" level 2 object information, and ID "003" level 1 object information are decided upon in that order as display object information for first through third object areas 833-1 through 833-3.

As shown in FIG. 11, in information superimposed image 840, first through third object information 841-1 through 841-3 corresponding to first through third object areas 833-1 through 833-3 are drawn in overlapping fashion. Also, first through third object information 841-1 through 841-3 are positioned along line segment 842 (not actually displayed) indicating depth of the input image, and in such a way that there is no overlapping of first through third object information 841-1 through 841-3.

Also, the contents of first through third object information 841-1 through 841-3 become more detailed the nearer the information is to the viewpoint of input image 830—that is, the farther to the fore the information is. Specifically, for example, the amount of information of first object information 841-1 farthest to the fore is nine words, whereas the amount of information of distant third object information 841-3 is only a single letter.

When acquiring sequential information while moving, a user normally makes a decision on whether or not to visit a facility first for a facility that is nearer. Consequently, a user probably wants to see more details in information relating to a nearby facility. At the same time, having some kind of information displayed for a distant facility is useful in deciding which direction to proceed in. On the other hand, if detailed information is also displayed for a distant facility, information that a user wishes to know in detailed form, and the input image, become difficult to see.

Therefore, according to this kind of information superimposed image shown in FIG. 11, information that a user wishes to know can be displayed to the user in an easy-to-see fashion, and user movements and actions can be supported more appropriately.

If an image of an object shown in an input image moves continuously, provision may be made for information displaying apparatus 100 to track an object area image and move displayed object information within the image. In this way, information displaying apparatus 100 can omit the processing in steps S1010 through S1070, and reduce the processing load.

Also, if an object is a fixed object such as a building, information displaying apparatus 100 can recalculate an object area, object distance, and line segment indicating depth, based on a change in position and orientation information. By this means, information displaying apparatus 100 can simplify the processing in steps S1080 through S1100, and reduce the processing load.

Furthermore, if there are a plurality of object areas, information displaying apparatus 100 may perform steps S1030 through S1110 all together.

Provision may also be made for information displaying apparatus 100 to perform simultaneous parallel processing of a plurality of processes that can be performed simultaneously and in parallel, such as the processing in steps S1030 through S1080 and the processing in step S1090.

As described above, information displaying apparatus 100 according to this embodiment can display object related information, superimposed on a captured real-world image, as an amount of information in accordance with the viewpoint of the captured real-world image and the distance to the object. That is to say, information displaying apparatus 100 according to this embodiment displays object information superimposed on a captured real-world image while changing the way of displaying object information according to the distance of an object from a user carrying information displaying apparatus 100.

By this means, information displaying apparatus 100 according to this embodiment can show information display according to depth, with more information displayed for a nearer object and less for a more distant object. Therefore, information displaying apparatus 100 according to this embodiment is able to create display in such a way as to avoid confusion caused by an excessive amount of information, and makes it possible to display information that a user wants to know in an easy-to-see fashion.

Provision may also be made for information displaying apparatus 100 of this embodiment to acquire latitude and longitude information, and object identification or object information identification, using a different method, such as the method described in Patent Literature 1.

Embodiment 2

Embodiment 2 of the present invention is an example in which object information that is displayed is changed based on a user operation.

It is often the case that, when focusing attention on an object shown in an input image, a camera user performs a zoom operation, focusing operation, aperture operation, focus lock operation, and so forth, with respect to that object. In other words, an object that is subject to these operations is highly likely to be an object for which the user wants more detailed information.

Thus, an information displaying apparatus according to this embodiment reflects a user operation via operation input section 510 in an input captured real-world image (image zoom-in, focusing, or the like), and changes object information in conjunction with that captured real-world image.

First, the configuration of an information displaying apparatus according to this embodiment will be described.

Figure 12:
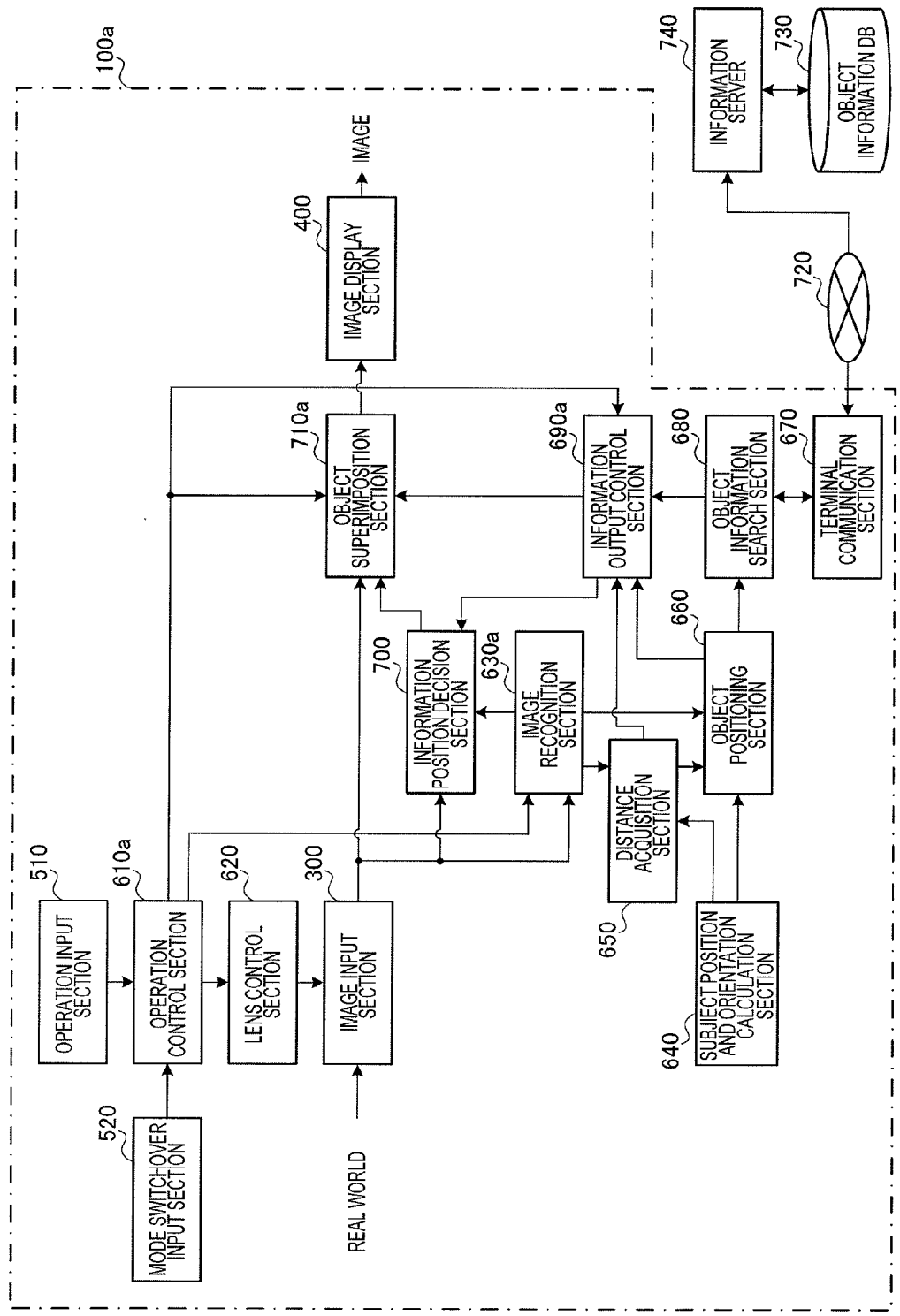
FIG. 12 is a block diagram showing the configuration of an information displaying apparatus according to Embodiment 2 of the present invention.

FIG. 12 is a block diagram showing the configuration of an information displaying apparatus according to this embodiment, corresponding to FIG. 6 of Embodiment 1. Parts in FIG. 12 identical to those in FIG. 6 are assigned the same reference codes as in FIG. 6, and descriptions thereof are omitted here.

In FIG. 12, information displaying apparatus 100a according to this embodiment has operation control section 610a, image recognition section 630a, information output control section 690a, and object superimposition section 710a, instead of, and differing from, operation control section 610, image recognition section 630, information output control section 690, and object superimposition section 710 in FIG. 6.

Operation control section 610a controls the way in which a user operation via operation input section 510 is reflected in an input captured real-world image and displayed object information, according to a mode set by means of mode switchover input section 520.

Specifically, in Photo mode, operation control section 610a reflects a user operation in an input image; in Photo+Info mode, operation control section 610a further changes displayed image information in conjunction with an input image; and in Info mode, operation control section 610a reflects a user operation only in displayed object information, and not in an input image (that is, lens control).

Image recognition section 630a recognizes an object shown in an input image, and also selects an object area of an object on which the focus point is positioned, or an object area that includes an object peripheral thereto, and outputs corresponding area information. Specifically, image recognition section 630a selects an object area of an object that is positioned within the depth-of-field range and that is in focus. That is to say, provision is made for image recognition section 630a to be able to receive a user's selection for an object for which object information is displayed by means of a zoom operation, focusing operation, and aperture operation.

Information output control section 690a controls displayed object information, and the information amount for that object information, according to an object distance. Also, information output control section 690a decides an object within the depth-of-field range to be a display object when an aperture operation is performed, and controls displayed observed information according to the zoom factor when a zoom operation is performed.

Object superimposition section 710a positions display object information in accordance with display layout information, and generates image data of an information superimposed image on which an icon indicating a focus position is superimposed. Also, when a focus lock operation is performed, object superimposition section 710a switches the display state of object information being displayed.

When an image input section 300 aperture operation is performed by an adjustment section provided in information displaying apparatus 100 (using lever 511 of operation input section 510, for example), operation control section 610a detects this, and generates operation information indicating the contents of the aperture operation.

The operation of information displaying apparatus 100a will now be described.

Figure 13:
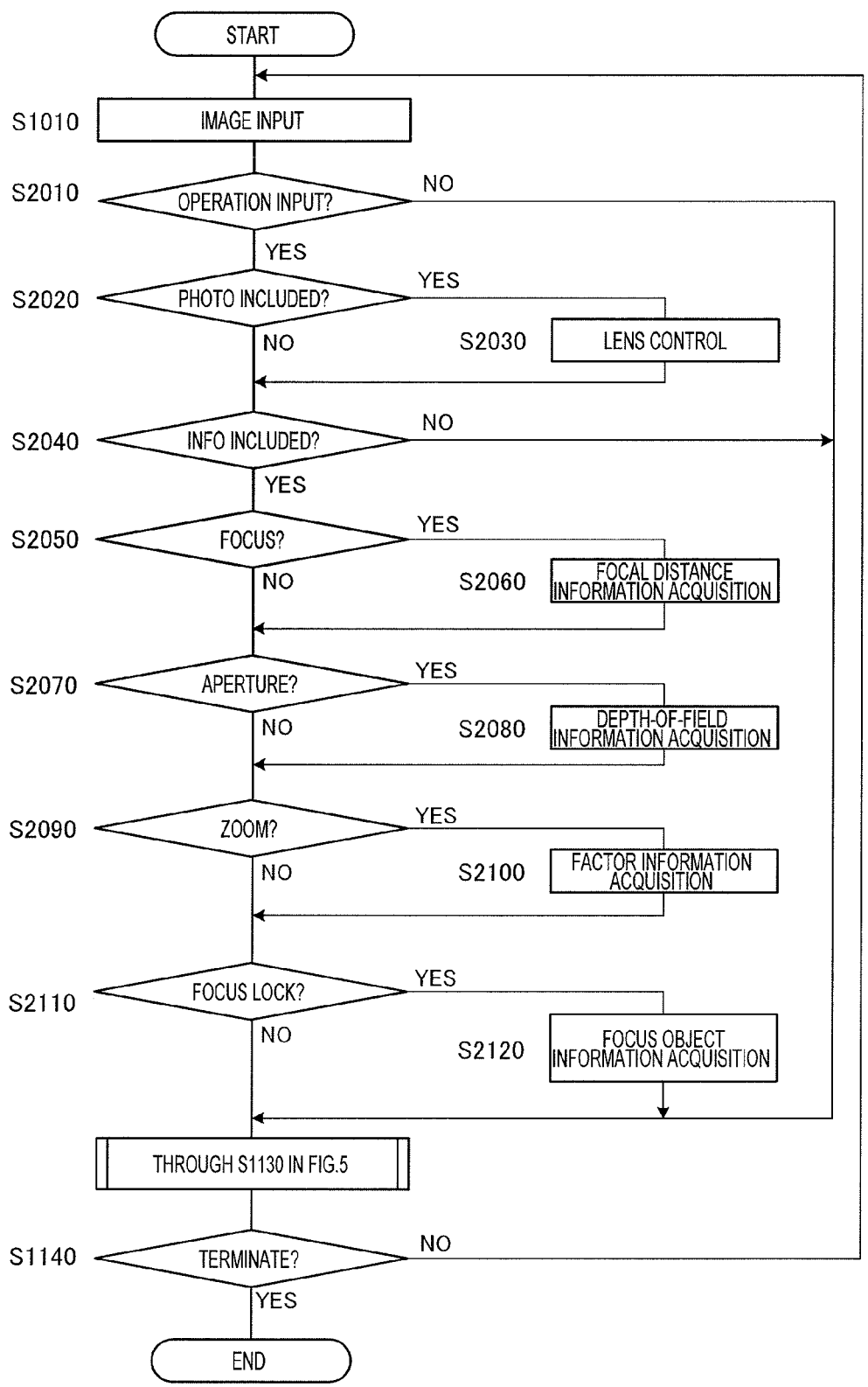
FIG. 13 is a flowchart showing the operation of an information displaying apparatus in Embodiment 2.

FIG. 13 is a flowchart showing the operation of information displaying apparatus 100a, corresponding to FIG. 9 of Embodiment 1. Parts in FIG. 13 identical to those in FIG. 9 are assigned the same reference codes as in FIG. 9, and descriptions thereof are omitted here.

When a captured real-world image is input (step S1010), operation control section 610a determines in step S2010 whether or not operation information has been input from operation input section 510. If operation information has been input (S2010: YES), operation control section 610a proceeds to step S2020, whereas if operation information has not been input (S2010: NO), operation control section 610a proceeds to step S1020. Operation information is, for example, information indicating that lever 511 of operation input section 510 has been moved 30 degrees to the right.

In step S2020, operation control section 610a determines whether the mode is Photo+Info mode or Photo mode—that is, a mode in which lens control is performed. If the mode is Photo+Info mode or Photo mode (S2020: YES), operation control section 610a proceeds to step S2030, whereas if the mode is Info mode (S2020: NO), operation control section 610a proceeds to step S2040.

In step S2040, operation control section 610a determines whether the mode is Photo+Info mode or Info mode—that is, a mode that includes object information display. If the mode is Photo+Info mode or Info mode (S2040: YES), operation control section 610a proceeds to step S2050, whereas if the mode is Photo mode (S2040: NO), operation control section 610a proceeds to step S1020 in FIG. 9.

In step S2050, operation control section 610a determines whether or not a focusing operation has been performed, based on input operation information. If a focusing operation has been performed (S2050: YES), operation control section 610a proceeds to step S2060, whereas if a focusing operation has not been performed (S2050: NO), operation control section 610a proceeds to step S2070.

In step S2060, operation control section 610a causes image recognition section 630a to acquire focal distance information indicating the focal distance of a focus point, and proceeds to step S2070. Image recognition section 630a acquires focus position information, for example, by acquiring a lens zoom value and focus value, and referencing a distance table in which these values and focal distance are entered in advance in a mutually associated form.

In step S2070, operation control section 610a determines whether or not an aperture operation has been performed, based on input operation information. If an aperture operation has been performed (S2070: YES), operation control section 610a proceeds to step S2080, whereas if an aperture operation has not been performed (S2070: NO), operation control section 610a proceeds to step S2090.

In step S2080, operation control section 610a causes information output control section 690a to acquire depth-of-field information indicating the depth of field of the lens, and proceeds to step S2090. Information output control section 690a acquires depth-of-field information, for example, by acquiring a lens zoom value, focus value, and aperture value, and referencing a depth-of-field table in which these values and depth of field are entered in advance in a mutually associated form.

In step S2090, operation control section 610a determines whether or not a zoom operation has been performed, based on input operation information. If a zoom operation has been performed (S2090: YES), operation control section 610a proceeds to step S2100, whereas if a zoom operation has not been performed (S2090: NO), operation control section 610a proceeds to step S2110.

In step S2100, operation control section 610a causes information output control section 690a to acquire factor information indicating a zoom factor, and proceeds to step S2110. Information output control section 690a acquires factor information, for example, by acquiring a lens zoom value, and referencing a factor table in which this value and a zoom factor are entered in advance in a mutually associated form.

In step S2110, operation control section 610a determines whether or not a focus lock operation has been performed, based on input operation information. If a focus lock operation has been performed (S2110: YES), operation control section 610a proceeds to step S2120, whereas if a focus lock operation has not been performed (S2110: NO), operation control section 610a proceeds to step S1020 in FIG. 9.

In step S2120, operation control section 610a causes object superimposition section 710a to acquire focus object information indicating an object that is subject to focus locking, and proceeds to step S1020 in FIG. 9.

Object superimposition section 710a acquires focus object information, for example, based on area information of an object on which a focus point is positioned.

Then information displaying apparatus 100a executes steps S1020 through S1140 in FIG. 9, and displays an information superimposed image. However, as regards the processing in each step, processing having different contents from Embodiment 1 is performed according to information acquisition in above steps S2060, S2080, S2100, and S2120. Processing contents that differ from Embodiment 1 will now be described.

In step S1030, image recognition section 630a determines a candidate point or candidate area representing an object area of a focus point or an object area near a focus point, based on focal distance information acquired in step S2060. Then image recognition section 630a causes object superimposition section 710a to display a mark indicating a determined candidate point or candidate area. With regard to this mark display, for example, image recognition section 630a selects only an object area peripheral to a focus point, information position decision section 700 decides the position of a mark based on area information, and object superimposition section 710a superimposes a mark at the decided position.

Then image recognition section 630a decides an amount of information that can be displayed and a way of presenting that information, based on a candidate point and candidate area. For example, image recognition section 630a decides a presentation method that includes the displayable amount of information based on the number of objects, the proportion of the entire input image occupied by object areas, the variation in brightness and color of areas other than object areas within the entire input image, and so forth. Then image recognition section 630a compares the number of objects and the respective amounts of object information, and selects a candidate point or candidate area so that the amount of information that is presented is not excessive. An area in which object information can be displayed is an area other than an object area, or an area in which part of an object area has been added to an area other than an object area.

Image recognition section 630a may also specify a candidate point or candidate area on receiving a user operation. At this time, for example, image display section 400 also functions as a touch panel type of input section, and receives a selection according to an area touched by the user. Image recognition section 630a may also receive a user operation via another operation section, such as an arrow key section, move a manipulated candidate point or candidate area, and make a decision as to selection or non-selection.

Then image recognition section 630a sends area information of an extracted object area to distance acquisition section 650, object positioning section 660, and terminal communication section 670, and proceeds to step S1040. When a candidate point or candidate area has been selected automatically or by means of a user operation, image recognition section 630a sends area information of an object area corresponding to a selected point or area.

In step S1070, information output control section 690a decides upon object information corresponding to an object positioned within a depth-of-field range as display object information, based on depth-of-field information acquired in step S2080.

As a result, in Photo+Info mode, object information of an object shown clearly in the vicinity of the focus point is displayed.

In step S1080, information output control section 690a decides display object information so that the level of detail is higher for a higher zoom factor, based on factor information acquired in step S2100. For example, information output control section 690a changes the level of detail according to the zoom factor when deciding display object information.

Specifically, the level of detail stipulated by the display information decision rules is raised by one in the case of a small zoom-up, and by two in the case of a large zoom-up.

As a result, in Photo+Info mode, the level of detail of object information changes in conjunction (synchronization) with a zoom operation on an input image, and in Info mode, only the level of detail of object information changes.

In step S1110, object superimposition section 710a changes the display mode of object information being displayed, based on focus object information acquired in step S2120, and superimposes this on the input image.

For example, object superimposition section 710a increases the transparency of object information being displayed, and enables the input image to be seen through the object information.

As a result, in Photo+Info mode, the display mode of object information changes in conjunction (synchronization) with a focus lock operation on an input image. On the other hand, in Info mode, only the display mode of object information changes.

In Photo mode, object information display is not shown since operation of information output control section 690a is stopped.

In the flowchart shown in FIG. 13, the fact that provision may be made for processing for which simultaneous parallel execution is possible to be executed simultaneously and in parallel is the same as in the case of the flowchart in FIG. 9.

Examples of change in a display image when various operations are performed will now be described.

FIG. 14 is a drawing showing an example of change in a display image when a zoom operation is performed in Info mode, corresponding to FIG. 11 of Embodiment 1.

Figure 14A:
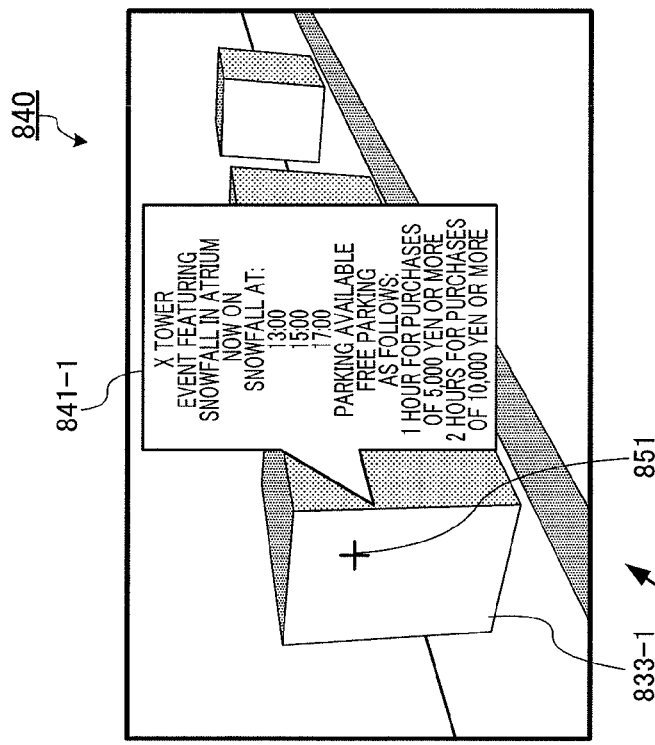
FIG. 14 is a drawing showing an example of change in a display image when a zoom operation is performed in Info mode in Embodiment 2.
Figure 14B:
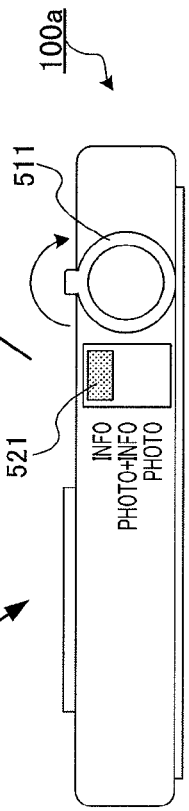
Figure 14C:
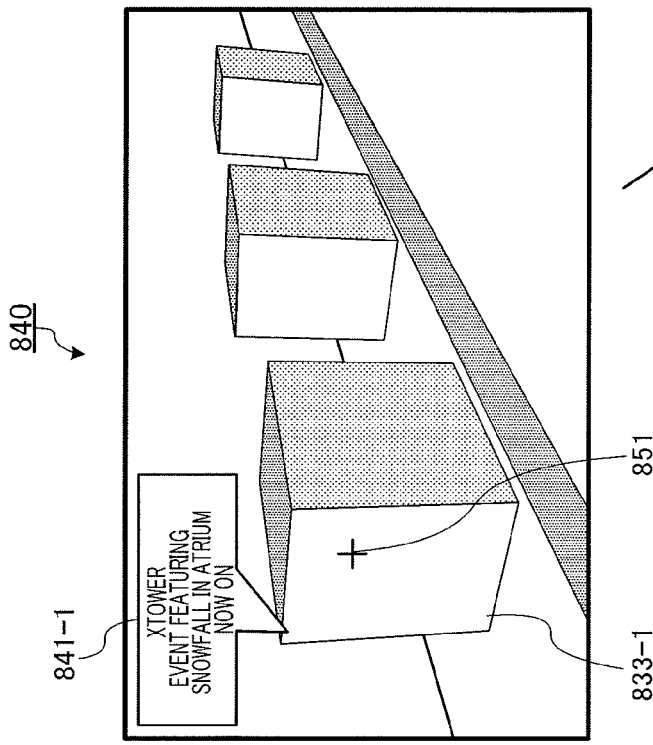

First, as shown in FIG. 14A, it is assumed that focus point 851 is positioned in first object area 833-1, and only first object information 841-1 is displayed. If a zoom-up operation is performed in Info mode in this state, as shown in FIG. 14B, the level of detail of first object information 841-1 increases in a state in which the input image is not zoomed-up, as shown in FIG. 14C.

Making it possible to manipulate only the level of detail of object information in this way enables a user to obtain more detailed information relating to a desired object with the input image state unchanged.

FIG. 15 is a drawing showing an example of change in a display image when a zoom operation is performed in Photo+Info mode, corresponding to FIG. 14.

First, as shown in FIG. 15A, it is assumed that focus point 851 is positioned in first object area 833-1, and only first object information 841-1 is displayed. If a zoom-up operation is performed in Photo+Info mode in this state, as shown in FIG. 15B, the input image is zoomed-up as shown in FIG. 15C. Furthermore, as shown in FIG. 15C, the level of detail of first object information 841-1 increases in conjunction with the input image zoom-up.

By changing the level of detail of object information in conjunction with a normal zoom operation in this way, a user can obtain more detailed information relating to a desired object by means of a natural operation of zooming-in on an object of interest.

FIG. 16 is a drawing showing an example of change in a display image when an aperture operation is performed in Photo+Info mode, corresponding to FIG. 11.

First, as shown in FIG. 16A, it is assumed that first through third object information 841-1 through 841-3 are displayed. Assume that an operation to open the aperture is performed in Photo+Info mode in this state, as shown in FIG. 16B. Then, for example, guide display of first and second candidate points 852-1 and 852-2 is performed near focus point 851, as shown in FIG. 16C. The final display is then narrowed down to display only object information 841-2 corresponding to the one within the depth-of-field range narrowed down by the operation to open the aperture—that is, second candidate point 852-2.

Thus, in this embodiment, it is made possible for the level of detail of object information to be changed in conjunction (synchronization) with a normal aperture operation. By this means, a user can obtain more detailed information relating to a desired object by means of a natural operation of opening the aperture when an object of interest has been defined. Also, a user can adjust the number of items of object information to be displayed by means of aperture adjustment.

FIG. 17 is a drawing showing an example of change in a display image when a focus lock operation is performed in Info mode, corresponding to FIG. 15.

First, in the example shown in FIG. 17A, it is assumed that only first object information 841-1 is displayed. If a focus lock operation is performed in Info mode in this state, as shown in FIG. 17B, first object information 841-1 takes on a degree of transparency of 50%, as shown in FIG. 17C.

Thus, in this embodiment, it is made possible for the display mode of object information to be changed in conjunction with a normal focus lock operation. By this means, a user can ascertain with certainty that focus locking has been performed for the relevant object. Also, if object information is made transparent, a user can view an entire input image while checking the object information.

Thus, information displaying apparatus 100a according to this embodiment makes it possible for a user to easily select object information to be displayed and a level of detail of object information to be displayed. Also, information displaying apparatus 100a according to this embodiment makes it possible for a user to select at will whether displayed object information is changed in conjunction with an operation on an input image—that is, a normal camera operation—or is made independently operable. Therefore, information displaying apparatus 100a according to this embodiment enables a user to display information the user wants to know from among captured real-world image object information in a much more easy-to-see and accurate fashion. Furthermore, information displaying apparatus 100a according to this embodiment enables object information relating to a desired plurality of objects to be displayed easily. That is to say, information displaying apparatus 100a according to this embodiment enables implementation of intuitive control of an object a user wants to know about and an amount of information a user requires, and enables only information that a user wants to see to be presented as an appropriate amount of information by means of a simple user operation.

The correspondence relationship between actual operation contents of operation input section 510 of information displaying apparatus 100a according to this embodiment and internal adjustment contents such as zooming is not limited to a specific relationship. Also, the level of detail of object information may be made continuously variable. In particular, if operation input section 510 is capable of arbitrarily setting a continuously variable quantity such as a length of time or rotation angle, information displaying apparatus 100a may display a level of detail of object information in a continuously varying fashion in conjunction with a set variable quantity. Normally, a zoom operation can be performed by continuously varying the zoom factor. It could therefore be possible for information displaying apparatus 100a to change the level of detail of object information in conjunction with the zoom factor.

Information displaying apparatus 100a according to this embodiment has been assumed to have object information become more detailed when lever 511 of operation input section 510 is turned to the right, but is not limited to this. For example, information displaying apparatus 100a according to this embodiment may also provide for a rough level of detail to be set when lever 511 is turned to the left, and for a finer level of detail to be set when lever 511 is turned to the right, or may have functions the reverse of these in terms of left and right.

The modes of operation input section 510 are not limited to those described above, and any modes can be used that allow adjustment of a zoom factor and the like. Specifically, operation input section 510 modes may be provided that enable operations to be performed independently of a zoom operation, such as a mode in which the aperture ring of the lens of image input section 300 is used, or a mode in which arrow keys or the like are used, for example. The user can, for example, manipulate arrow keys or the like while viewing an aperture value displayed on image display section 400.

Mode switchover input section 520 modes are not limited to the above, and other representations such as "Info, Video+Info, Video," "navigation, movement, camera," and the like, may also be used, and a dial system may also be employed.

A change in the object information display mode when a focus lock operation is performed is not limited to the above. For example, a change in the display mode may be a change to an arbitrary degree of transparency, a highlighted information display, and so forth. Examples of highlighted displays include a change in the color, density, brightness, thickness, or font, of text, flashing text, display of a frame containing text, highlighting of the edge of an object information display area, and a change in the color or brightness of other areas.

Provision may also be made for information displaying apparatus 100a to change the level of detail of object information according to the number of objects to be displayed. Specifically, for example, when the number of objects to be displayed is small, information displaying apparatus 100a may raise the level of detail of object information above the level stipulated by the display information decision rules.

Information displaying apparatus 100a may also control the effective time of object information according to shutter speed. Specifically, information displaying apparatus 100a executes control continuously as to whether associated information is presented within a time period with a narrow time span before and after or before or after the present time or a specified time by selecting a fast shutter speed, or associated information is presented within a time period with a broad time span before and after or before or after the present time or a specified time by selecting a slow shutter speed.

Provision may also be made for information displaying apparatus 100a to change the level of detail or display mode of object information in correspondence with another camera operation or camera setting (for example, a degree of exposure correction (sensitivity adjustment)). Specifically, for example, information displaying apparatus 100a executes control as to whether information on a facility in a range visible from a viewpoint is presented, or is presented together with information on a facility to the rear of a building that is not visible from the viewpoint.

Provision may also be made for information displaying apparatus 100a to enable the genre of object information to be displayed—such as restaurant information, amusement information, or the like—to be selected by means of a dial-type or equivalent menu similar to a camera's shooting menu.

Provision may also be made for information displaying apparatus 100a to change the color of an object area or object information indicated by a pointer. Furthermore, provision may also be made for information displaying apparatus 100a to be provided with an object information search interface, and for object information that is a result of a search to have its color changed, to be displayed in flashing mode, or to be displayed superimposed on an image while being indicated by a pointer such as an arrow.

Embodiment 3

Embodiment 3 of the present invention is an example in which an information superimposed image is recorded on a removable storage medium.

Recording an information superimposed image is useful if a generated information superimposed image is to be made usable elsewhere at a later time, since it allows information such as a location and evaluation of a facility to be conveyed to a third party. Thus, in this embodiment, provision is made for a generated information superimposed image to be recorded on a removable storage medium rather than simply being displayed.

Figure 18:
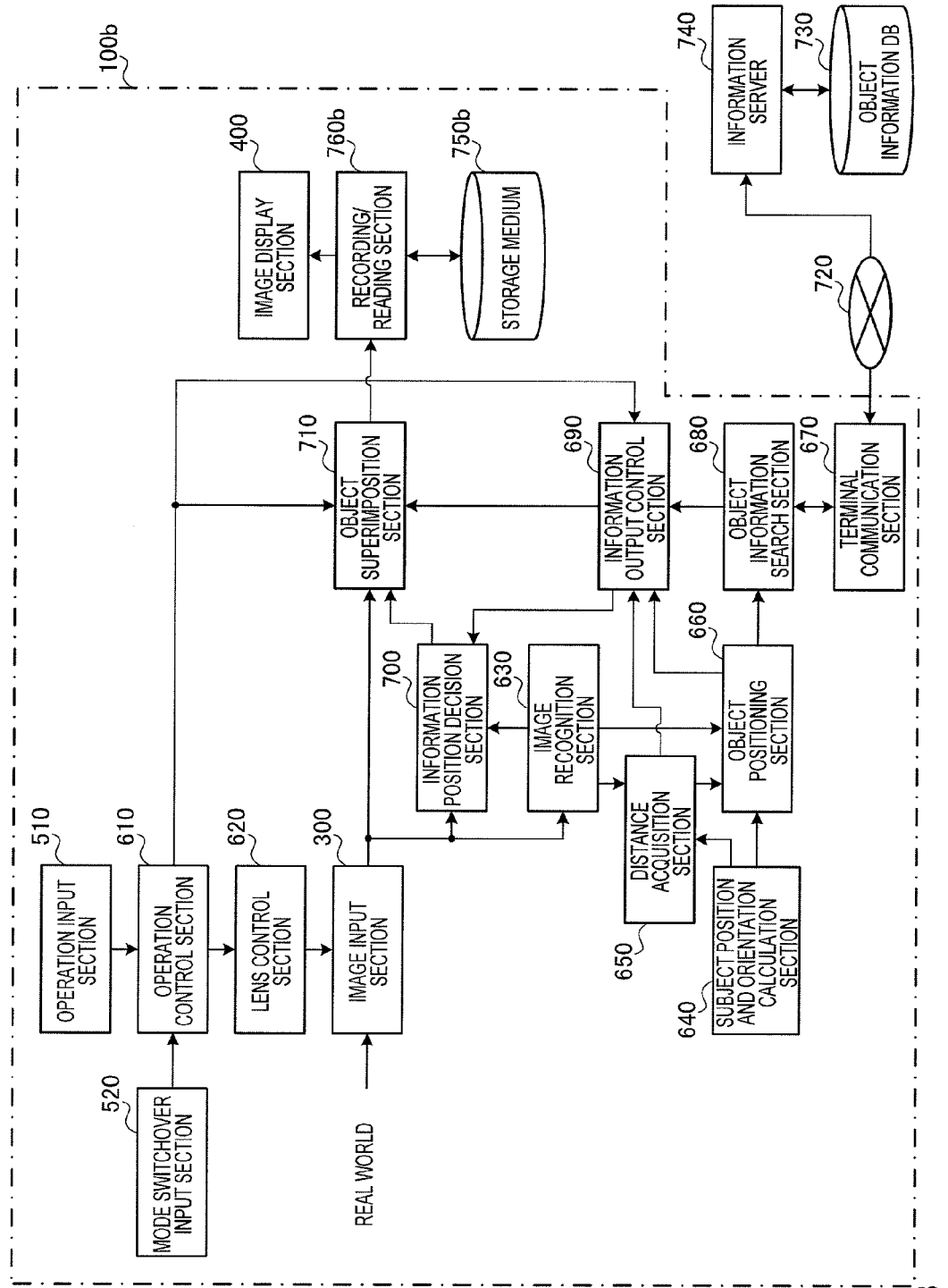
FIG. 18 is a block diagram showing the configuration of an information displaying apparatus according to Embodiment 3 of the present invention.

FIG. 18 is a block diagram showing the configuration of an information displaying apparatus according to this embodiment, corresponding to FIG. 6 of Embodiment 1. Parts in FIG. 18 identical to those in FIG. 6 are assigned the same reference codes as in FIG. 6, and descriptions thereof are omitted here.

In FIG. 18, information displaying apparatus 100b according to this embodiment has storage medium 750b and recording/reading section 760b. Storage medium 750b is connected to recording/reading section 760b. Recording/reading section 760b is positioned between object superimposition section 710 and image display section 400.

Storage medium 750b is a removable storage medium such as an SD memory card, for example.

In information superimposed image recording mode, recording/reading section 760b transfers information superimposed image data to image display section 400, and also records that data on storage medium 750b. In information superimposed image playback mode, recording/reading section 760b reads recorded information superimposed image data recorded on storage medium 750b from storage medium 750b, and sends that data to image display section 400.

Setting of information superimposed image recording mode and information superimposed image playback mode can be made by means of operation input section 510 and operation control section 610, for example. Information superimposed image data may be image data combining an input image and object information image, or may be image data in which input image data and object information related data are separated in a state in which an information superimposed image can be played back. Object information related data is, for example, data in which object information is recorded with coordinates (display layout information) indicating a spatial position within an image and a time code indicating a temporal position of an image mutually associated when superimposed with image data.

An information displaying apparatus of this kind can simultaneously record a captured captured real-world image and object information of the time of capture, and read and display these recorded items of information by means of a separate information displaying apparatus or the like.

Various kinds of recording media can be used, including an optical disk, semiconductor memory, CD (compact disc), DVD (digital versatile disk), BD (blu-ray disk), or suchlike memory device, a hard disk, any kind of memory in a network, as well as new types of memory such as optical memory.

Embodiment 4

Embodiment 4 of the present invention is an example in which a user operation can be received using a touch panel.

Many users capture an input image while checking the image on a display rather than through a viewfinder. For such users, being able to focus on a certain object shown in an input image and specify that object directly on the display simplifies a focusing operation, focus lock operation, and so forth for an object of interest that is seen in an input image. Thus, an information displaying apparatus according to this embodiment incorporates an operation input section using a touch panel for implementation of the above operations.

First, the configuration of an information displaying apparatus according to this embodiment will be described.

Figure 19:
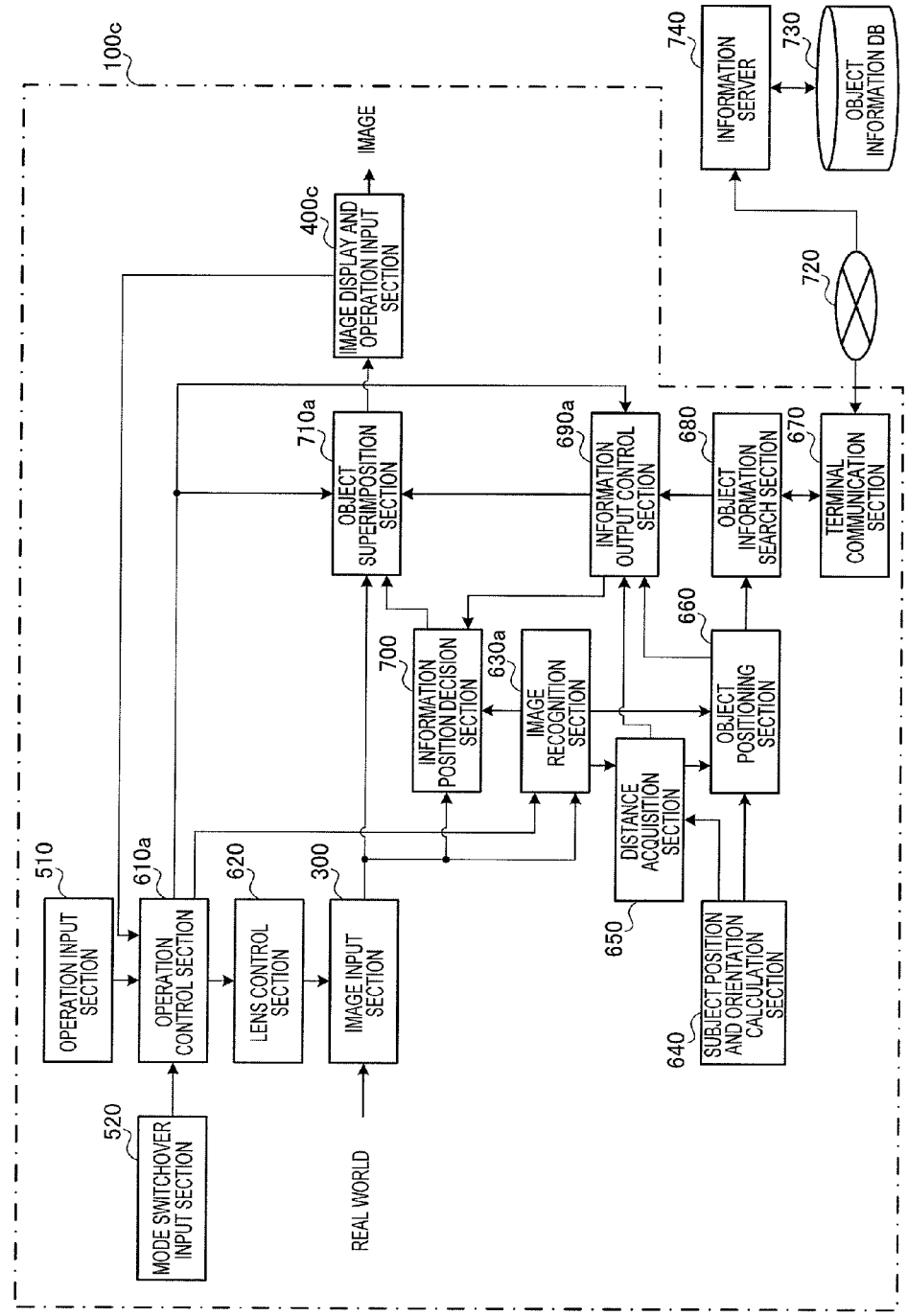
FIG. 19 is a block diagram showing the configuration of an information displaying apparatus according to Embodiment 4 of the present invention.

FIG. 19 is a block diagram showing the configuration of an information displaying apparatus according to this embodiment, corresponding to FIG. 12 of Embodiment 2. Parts in FIG. 19 identical to those in FIG. 12 are assigned the same reference codes as in FIG. 12, and descriptions thereof are omitted here.

In FIG. 19, information displaying apparatus 100c according to this embodiment has image display and operation input section 400c instead of image display section 400 in FIG. 12.

Image display and operation input section 400c has a liquid crystal display (equivalent to image display section 400 of Embodiment 2) and an integral touch panel (not shown). Image display and operation input section 400c receives at least a focusing operation that sets a focus point at an arbitrary position on the screen, and a focus lock operation that maintains the present focal distance, by means of user touch operations.

Then image display and operation input section 400c outputs operation information indicating the contents of a received touch operation to operation control section 610a. More specifically, when an operation specifying a focus point is performed, image display and operation input section 400c outputs operation information to operation control section 610a directing that the lens be focused on the specified position, and when a focus lock operation is performed, image display and operation input section 400c outputs operation information to operation control section 610a indicating that a focus lock operation has been performed.

The operation of information displaying apparatus 100c will now be described.

A user, for example, touches the touch panel with the tip of a finger in the vicinity of an object for which the user wants to check object information. Image display and operation input section 400c then outputs operation information specifying the position of the touched place as a focus point to operation control section 610a (step S2010 in FIG. 13: YES).

Subsequent operations are the same as in Embodiment 2. That is to say, image recognition section 630a recognizes an object shown in an input image. Then image recognition section 630a selects an object area of an object on which the focus point is positioned, or an object area that includes an object peripheral thereto, and outputs corresponding area information. As a result, an image focused upon in the vicinity of the place touched by the user's fingertip, and object information of an object in the vicinity thereof, are displayed on image display and operation input section 400c.

Thus, provision is made for information displaying apparatus 100c to be able to receive a user selection for an object for which object information is to be displayed by means of a touch operation.

FIG. 20 is a drawing showing an example of change in a display image when a touch operation is performed in Photo+ Info mode, corresponding to FIG. 16.

First, it is assumed that first through third object areas 833-1 through 833-3 are present, as shown in FIG. 20A. Assume that, in this state, a touch operation has been performed by finger 861 in Photo+Info mode, and a focus point position has been specified in first object area 833-1, as shown in FIG. 20B and FIG. 20C. Then, for example, specified position 862 becomes the focus point and guide display of this position is performed, and first object information 841-1 is displayed.

Thus, information displaying apparatus 100c receives a focusing operation, focus lock operation, and so forth, for an object by means of a direct specification operation on a display. By this means, a user can obtain more detailed information relating to a desired object by means of a natural operation of touching an object of interest on a display screen.

If a touch panel operation is not to be reflected in an input captured real-world image, information displaying apparatus 100c may input operation information concerning a touch panel operation to image recognition section 630. In this case, image recognition section 630 can, for example, extract an object area at the touched position, and select only the extracted object area as a processing object.

Image recognition section 630 may also process the whole or part of an image as an object area in a similar way in a situation in which there is no clearly defined object such as a building. For example, in the case of an image showing sea and sky, or an image showing only sky, part of the sky may be taken as an object, and information associated with spatial coordinates may be displayed as object information.

Embodiment 5

Embodiment 5 of the present invention is an example in which a more detailed user operation is received using a touch panel.

It may be that a large amount of object information is recorded corresponding to the same position or a narrow range on a display. Thus, an information displaying apparatus according to this embodiment narrows down displayed object information by receiving a display object condition narrowing-down operation from a user.

First, the configuration of an information displaying apparatus according to this embodiment will be described.

Figure 21:
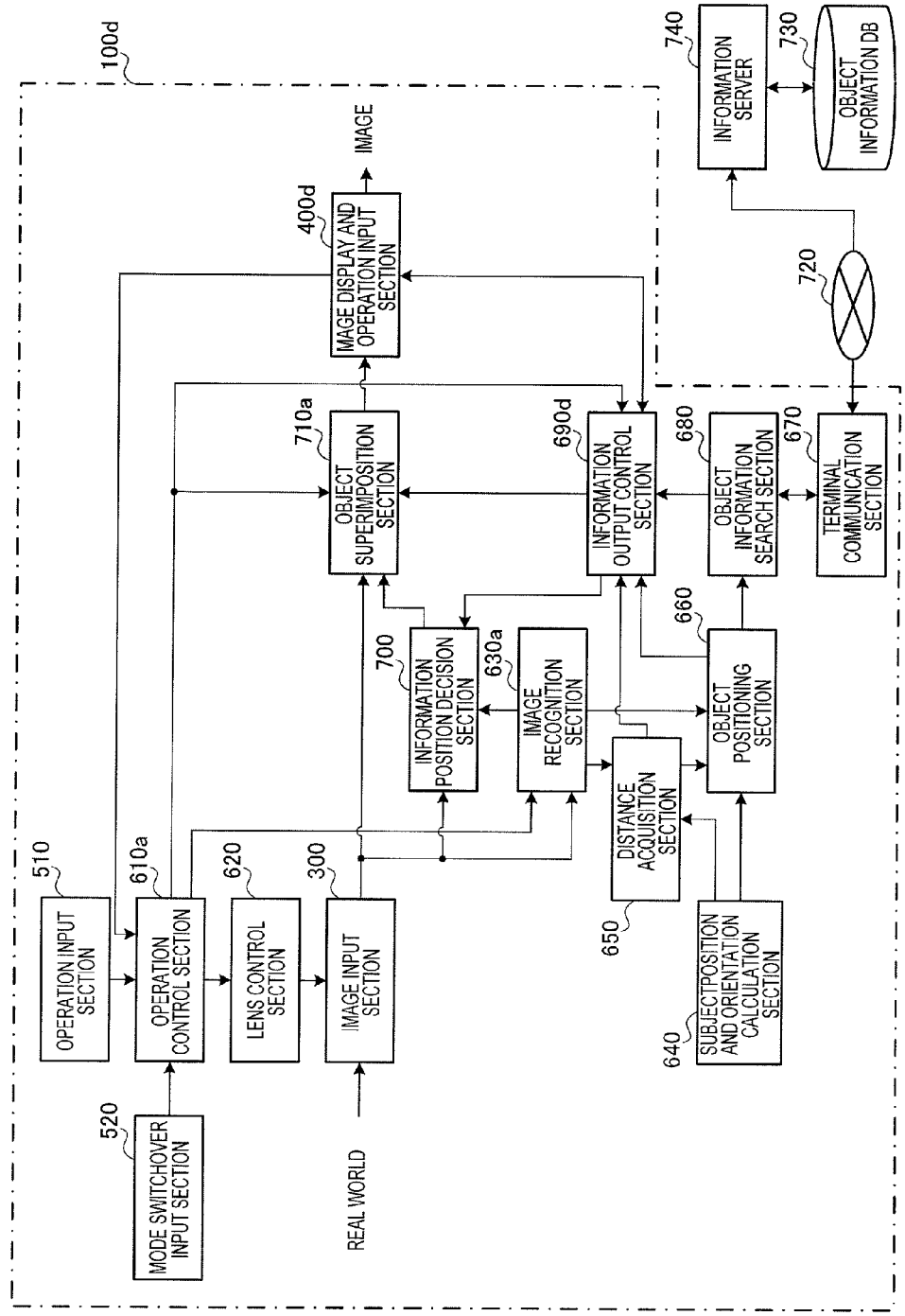
FIG. 21 is a block diagram showing the configuration of an information displaying apparatus according to Embodiment 5 of the present invention.

FIG. 21 is a block diagram showing the configuration of an information displaying apparatus according to this embodiment, corresponding to FIG. 19 of Embodiment 4. Parts in FIG. 21 identical to those in FIG. 19 are assigned the same reference codes as in FIG. 19, and descriptions thereof are omitted here.

In FIG. 21, information displaying apparatus 100d according to this embodiment has image display and operation input section 400d and information output control section 690d instead of, and differing from, image display and operation input section 400c and information output control section 690a in FIG. 19.

Image display and operation input section 400d receives a condition specification operation specifying a display object condition. Here, condition specification operations include at least an operation specifying an object distance and an operation specifying an effective time of object information. An effective time of object information (hereinafter also referred to simply as "effective time") is a date and time representing a time for which object information is effective. When a condition specification operation is performed, image display and operation input section 400d outputs operation information indicating the contents of the condition specification operation to information output control section 690d. Details of reception of a condition specification operation will be given later herein.

Information output control section 690d controls displayed object information according to a condition specification operation indicated by operation information input from image display and operation input section 400d. More specifically, when an operation specifying an object distance is performed, information output control section 690d decides upon object information of an object corresponding to the specified object distance as display object information, and when an operation specifying an effective time is performed, information output control section 690d decides upon object information of an object corresponding to the specified effective time as display object information.

Also, in this embodiment, it is assumed that an object information table with contents different from those in Embodiment 1 through Embodiment 4 is stored in object information database 730.

FIG. 22 is a drawing showing an example of the contents of an object information table in this embodiment.

As shown in FIG. 22, object information table 810d contains object information 813 through 816 associated with not only object ID 811 and object position 812, but also effective time 817d. Also, the attributes of object information 813 through 816 here differ from those in Embodiment 1 through Embodiment 4.

Level 1 object information 813 is label information of a posting (word-of-mouth information) by a general user concerning a facility. Level 2 object information 814 is detailed information concerning word-of-mouth information. Level 3 object information 815 is a comment or topic information concerning a facility. And level 4 object information 816 is reference information indicating a URL (uniform resource locator) or the like for further referencing external information concerning a facility. That is to say, level 1 through level 4 object information 813 through 816 allow information grading to be set freely with regard to the number of levels and information provided at each level.

For example, "Train problems, not moving" is associated, as a word-of-mouth information label, with a combination of position "latitude: xx1, longitude: yy2" and effective time "2009/11/4, 8:30." Also, "Live performance" is associated, as a word-of-mouth information label, with a combination of position "latitude: xx1, longitude: yy2" and effective time "2009/11/4, 20:30." That is to say, even if the object is the same, if the effective time is different, different object information is associated with the object.

The operation of information displaying apparatus 100d will now be described.

A user performs a condition specification operation, for example, by touching an indicator described later herein on the touch panel. Image display and operation input section 400d then outputs operation information indicating the contents (object distance or effective time) of the condition specification operation to information output control section 690d.

When operation information of a condition specification operation specifying an object distance has been input, information output control section 690d decides upon object information corresponding to the specified object distance as display object information. Also, when operation information of a condition specification operation specifying an effective time has been input, information output control section 690*d* decides upon object information corresponding to the specified effective time as display object information.

Operations after a display object has been decided are the same as in Embodiment 4. As a result, object information displayed on image display and operation input section 400*d* is narrowed down to object information corresponding to a condition (object distance or effective time) specified by the user.

Provision may also be made to narrow down object information by object information search section 680. In this case, object information search section 680 has operation information indicating condition specification operation contents as input, and performs the following kind of operation.

When operation information of a condition specification operation specifying an object distance has been input, object information search section 680, for example, calculates a range with its own position as the center and the specified object distance as the radius as latitude and longitude information. Then object information search section 680 searches for object information using the latitude and longitude information as a key in the same way as in Embodiment 2.

Specifically, object information search section 680 transmits input latitude and longitude information to information server 740, via terminal communication section 670, as an object information database 730*d* search query.

Then object information search section 680 outputs object information sent back from information server 740 to information output control section 690. Object information search section 680 also outputs the effective time to information output control section 690 in a similar way.

An example of change in a display image when various operations are performed will now be described.

Figure 23C:
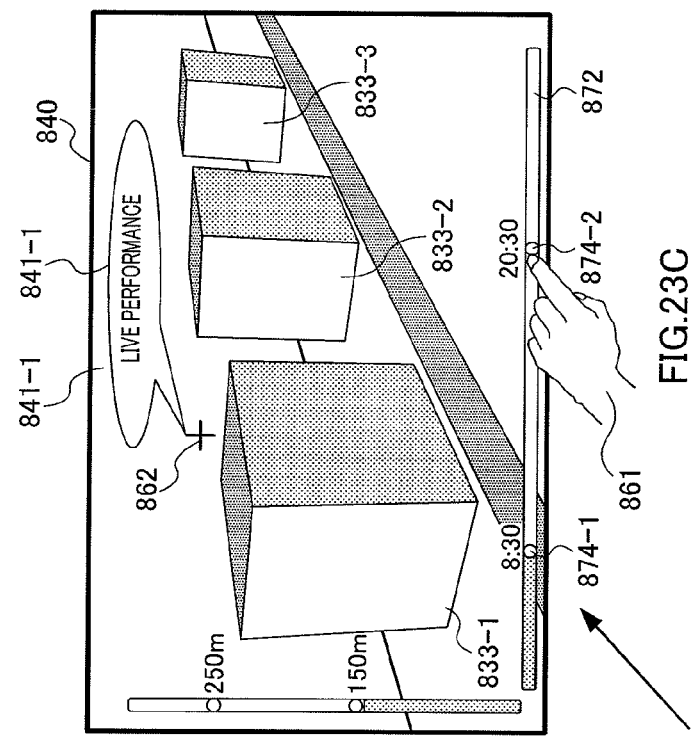
FIG. 23 is a drawing showing an example of change in a display image when a touch operation is performed in Photo+ Info mode in Embodiment 5.
Figure 23B:
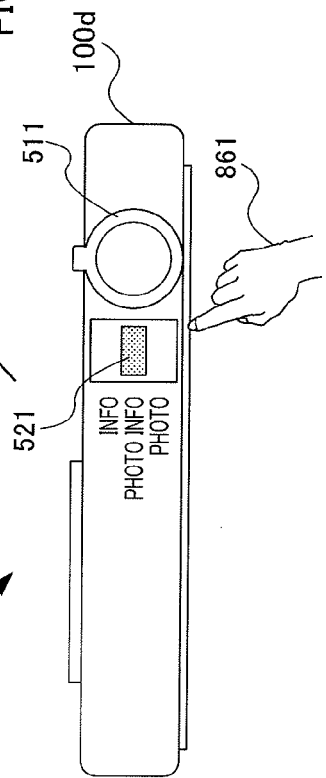

FIG. 23 is a drawing showing an example of change in a display image when a touch operation is performed in Photo+ Info mode, corresponding to FIG. 16. Parts in FIG. 23 identical to those in FIG. 16 are assigned the same reference codes as in FIG. 16, and descriptions thereof are omitted here.

As shown in FIG. 23, information superimposed image 840*d* displayed by image display and operation input section 400*d* has distance indicator 871 and effective time indicator 872. The distance indicator displays the object distance of each object area currently focused upon by means of distance mark 873. Effective time indicator 872 displays an effective time of object information of an object area currently focused upon by means of time mark 874. Here, an object area focused upon is an object area of a focus point or an object area near a focus point.

In order to display distance mark 873 and time mark 847, image display and operation input section 400*d* acquires object information of each object area focused upon from information output control section 690*d* in advance.

It is assumed here that first and second object areas 833-1 and 833-2 are object areas focused upon.

In this case, distance indicator 871 displays first distance mark 873-1 indicating 150 m and second distance mark 873-2 indicating 250 m, corresponding to first and second object areas 833-1 and 833-2, respectively.

Also, effective time indicator 872 displays first and second time marks 874-1 and 874-2 indicating effective times of each item of object information present in correspondence to first and second object areas 833-1 and 833-2.

By default, image display and operation input section 400*d* is in a state in which one of distance marks 873 and one of time marks 874 are selected. It is assumed here that the level of display object information is level 1, and first distance mark 873-1 is selected by default. It is also assumed that first and second distance marks 873-1 and 873-2 indicate "8:30" and "20:30," respectively, and first distance mark 873-1 is selected by default.

Figure 23A:
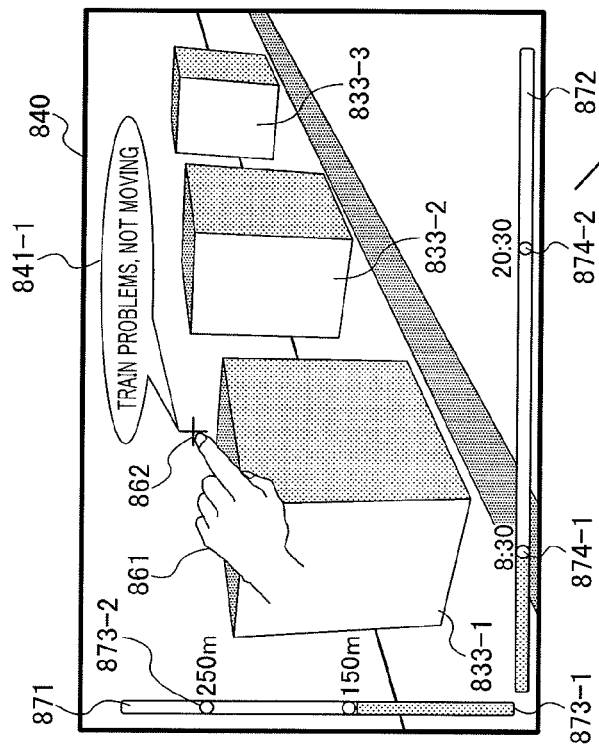

In this case, as shown in FIG. 23A, displayed object information is narrowed down to "Train problems, not moving," which is information corresponding to effective time "8:30," among object information of first object area 833-1.

Assume that second distance mark 873-2 is touched by finger 861 in this state, as shown in FIG. 20B and FIG. 20C. The displayed object information is then changed to "Live performance," which is information corresponding to effective time "20:30," as shown in FIG. 23C.

It is desirable for information superimposed image 840*d* to display which object distance and which effective time the currently displayed object information corresponds to. Here, an example has been shown in which this display is shown by means of the color of distance indicator 871 and effective time indicator 872, but a color change or flashing of distance mark 873 and time mark 874 may also be used, for instance.

Thus, an information displaying apparatus according to this embodiment enables narrowing down of displayed object information to be performed by means of a display touch operation. Also, an information displaying apparatus according to this embodiment enables a narrowing-down operation specification to be made by making a selection from among object distances and effective times displayed on a display.

Therefore, an information displaying apparatus according to this embodiment enables easy viewing even when a plurality of items of object information are attached to the same object, or when a plurality of items of object information are attached to the same coordinates or a narrow range in an image. Furthermore, an information displaying apparatus according to this embodiment makes it possible to search for, select, and view object information of an arbitrary object peripheral to a focus position even if the object is not seen on a screen. That is to say, a user can obtain more detailed information relating to a desired object by means of a natural operation of touching an object of interest on a display screen.

Specifiable conditions are not limited to object distance and effective time, and various kinds of conditions relating to information included in an object information table can be used. For example, an object information recording time, setting time, or the like, may be used as a specifiable condition.

In the above embodiments, cases have been described in which object information is acquired from a predetermined information server, but provision may also be made for appropriate object information to be searched for on a communication network using a search engine.

In these embodiments, cases have been described in which an object information database is provided in an external apparatus, and object information is acquired via a communication network, but a configuration may also be used whereby an object database is provided in advance in an information displaying apparatus. Provision may also be made for an information displaying apparatus to acquire necessary object information from an external apparatus only if that object information is not being held by the information displaying apparatus.

An information displaying apparatus may also be configured in such a way that object information is cached once acquired, and that object information is not acquired from outside is again.

Provision may also be made for object information not to be provided in advance for each level of detail, but for an information displaying apparatus to edit object information using a text summarizing function or the like so as to conform to a specified level of detail.

Depending on a particular use, provision may also be made for information to be more detailed the greater the object distance is, or for information to be more detailed the nearer the focus position is. In the latter case, the proportion of simplification (detail) of information with respect to distance from a focus position may be made symmetrical or may be made asymmetrical. Specifically, for example, according to the depth of field, the proportion of simplification (detail) is decreased for an object to the fore of the focus position, and the proportion of simplification (detail) is increased for an object to the rear of the focus position.

The disclosure of Japanese Patent Application No. 2008-331451, filed on Dec. 25, 2008, including the specification, drawings and abstract, is incorporated herein by reference in its entirety.

INDUSTRIAL APPLICABILITY

An information displaying apparatus and information displaying method according to the present invention are suitable for use as an information displaying apparatus and information displaying method that can provide an easy-to-see display of information that a user wants to know from among information relating to objects shown in a captured real-world image. Specifically, the present invention is suitable for use as an augmented reality system that displays the information relating to an object shown in a captured real-world image, superimposed on the captured real-world image, and can be applied to training, education, space exploration, wearable systems, and entertainment systems, for example. In addition, the present invention is suitable for use as a real-world information search system that performs intuitive control of an object for which a user wants to obtain information and the amount of such information, and can be applied to a digital still camera, digital video camera, car navigation system, mobile phone navigation system, and measuring and surveying system, for example.

REFERENCE SIGNS LIST 100, 100a, 100b, 100c, 100d Information displaying apparatus
200 Body section
300 Image input section
400 Image display section
400c, 400d Image display and operation input section
500 Operating interface section
510 Operation input section
511 Lever
512 Button
520 Mode switchover input section
521 Switch
522 Sliding section
610, 610a Operation control section
620 Lens control section
630, 630a Image recognition section
640 Subject position and orientation calculation section
650 Distance acquisition section
660 Object positioning section
670 Terminal communication section
680 Object information search section
690, 690a, 690d Information output control section
700 Information position decision section
710, 710a Object superimposition section
720 Communication network
730 Object information database
740 Information server
750b Storage medium
760b Recording/reading section

The invention claimed is:

1. An information displaying apparatus, comprising:
an image input section that receives, as an input, a captured real-world image;
a distance acquisition section that measures and acquires, for each of a plurality of objects shown in the captured real-world image, a horizontal distance in the real-world between the object and a viewpoint of the captured real-world image, the horizontal distance negating an elevation of the object with respect to the viewpoint in the real-world;
a subject position and orientation acquisition section that acquires a position of the viewpoint in the real-world;
an object positioning section that calculates and acquires, for each object of the objects, a real-world position of the object, the real-world position calculated based on the position of the viewpoint, the horizontal distance, a direction, and an angle of elevation of the object with reference to the viewpoint;
an object information search section that searches, for each object of the objects, for a piece of information relating to the object using the real-world position of the object as a search key, and acquires the piece of information;
an object superimposition section that outputs an image in which pieces of information corresponding to the objects are superimposed on the captured real-world image; and
an information output control section that controls, for each of the objects, the piece of information output from the object superimposition section,
wherein, the shorter the acquired horizontal distance is, the greater an information amount for the piece of information which is displayed in the image output from the object superimposition section is to be decided, for each of the objects, by the information output control section, and
the information amount for the piece of information, for each of the objects, is determined based on a number of the objects and a proportion of the captured real-world image occupied by object areas of the objects, the piece of information corresponding to each object being displayed in an area of the captured real-world image other than the object areas.

2. The information displaying apparatus according to claim 1, wherein, the shorter the horizontal distance is, the more an emphasized presentation mode for the piece of information is to be decided, for each of the objects, by the information output control section.

3. The information displaying apparatus according to claim 1, further comprising:
an image recognition section that recognizes from the captured real-world image each of the objects shown in the captured real-world image,
wherein the information output control section makes the object superimposition section output the piece of information relating to each of the objects.

4. The information displaying apparatus according to claim 1, wherein the object positioning section acquires the real-world position of each of the objects based on an area in the captured real-world image of each of the objects and a viewpoint and a field of view of the captured real-world image.

5. The information displaying apparatus according to claim 2, further comprising:
a lens control section that changes a zoom factor of the captured real-world image input by the image input section,
wherein, the larger a zoom factor of the captured real-world image is, the greater information amount for the piece of information is to be decided by the information output control section.

6. The information displaying apparatus according to claim 1, wherein the information output control section decides upon the objects that are information display objects from among the objects shown in the captured real-world image.

7. The information displaying apparatus according to claim 6, wherein the information output control section decides upon the objects that are the information display objects by being within a range of a predetermined number of the objects.

8. The information displaying apparatus according to claim 6, further comprising:
a lens control section that changes a focus position of the captured real-world image input by the image input section,
wherein the information output control section decides upon the objects near the focus position as the information display objects.

9. The information displaying apparatus according to claim 8,
wherein the lens control section receives a predetermined operation and fixes the focus position, and
the object superimposition section changes the information amount for the piece of information which is displayed when the focus position has been fixed.

10. The information displaying apparatus according to claim 6, further comprising:
a lens control section that changes a depth of field of the captured real-world image input by the image input section,
wherein the information output control section decides upon the objects positioned within a range of the depth of field as the information display objects.

11. The information displaying apparatus according to claim 1, wherein the object superimposition section displays the piece of information, associated with an area in the captured real-world image of the corresponding object.

12. The information displaying apparatus according to claim 3, further comprising:
an information position decision section that decides display positions of the pieces of information of the objects as positions corresponding to real-world positional relationships of the objects.

13. The information displaying apparatus according to claim 12, wherein the information position decision section detects a depth direction of the captured real-world image, and decides the display positions of the pieces of information of the objects so as to be aligned in the depth direction.

14. The information displaying apparatus according to claim 1, further comprising:
an operation input section that receives a user operation; and
an operation control section that switches among and sets a mode in which the user operation is reflected in the captured real-world image, a mode in which the user operation is reflected in the pieces of information output by the object superposition section, and a mode in which the user operation is reflected in the captured real-world image and the pieces of information are changed in conjunction with the captured real-world image.

15. The information displaying apparatus according to claim 1, further comprising:
an operation input section that receives a user operation via a touch panel operation for the image output by the object superimposition section.

16. An information displaying method, comprising:
receiving, as an input, a captured real-world image;
measuring and acquiring, for each of a plurality of objects shown in the captured real-world image, a horizontal distance in the real-world between the object and a viewpoint of the captured real-world image, the horizontal distance negating an elevation of the object with respect to the viewpoint in the real-world;
acquiring a position of the viewpoint in the real-world;
calculating and acquiring, by a processor for each object of the objects, a real-world position of the object, the real-world position based on the position of the viewpoint, the horizontal distance, a direction, and an angle of elevation of the object with reference to the viewpoint;
searching, for each object of the objects, for a piece of information relating to the object using the real-world position of the object as a search key, and acquiring the piece of information;
deciding, for each object of the objects, a greater information amount for the piece of information relating to the object and to be displayed as the shorter the acquired horizontal distance is; and
outputting pieces of information corresponding to the objects in the decided information amount superimposed on the captured real-world image, wherein the information amount for the piece of information, for each of the objects, is determined based on a number of the objects and a proportion of the captured real-world image occupied by object areas of the objects, the piece of information corresponding to each object being displayed in an area of the captured real-world image other than the object areas.

17. The information displaying apparatus according to claim 1, wherein the distance acquisition section acquires, for each of the objects, an actual distance in the real-world between the object and the viewpoint, and converts the actual distance to the horizontal distance based on an angle of elevation of the object with respect to the viewpoint in the real-world.

18. The information displaying apparatus according to claim 1, wherein the pieces of information are displayed on a perspective line that extends radially from a vanishing point of the captured real-world image.

19. An information displaying apparatus, comprising:
a display;
a processor; and
a memory including a set of instructions that, when executed by the processor, cause the processor to perform operations including:
receiving, as an input, a captured real-world image;
measuring and acquiring, for each of a plurality of objects shown in the captured real-world image, a horizontal distance in the real-world between the object and a viewpoint of the captured real-world image, the horizontal distance negating an elevation of the object with respect to the viewpoint in the real-world;
acquiring a position of the viewpoint in the real-world;
calculating and acquiring, for each object of the objects, a real-world position of the object, the real-world position calculated based on the position of the viewpoint, the horizontal distance, a direction, and an angle of elevation of the object with reference to the viewpoint;

searching, for each object of the objects, for a piece of information relating to the object using the real-world position of the object as a search key, and acquiring the piece of information;

outputting an image on the display in which pieces of information corresponding to the objects are superimposed on the captured real-world image; and controlling, for each of the objects, the piece of information output from the object superimposition section, wherein, the shorter the acquired horizontal distance is, the greater an information amount for the piece of information which is displayed in the image is to be decided, for each of the objects, and the information amount for the piece of information, for each of the objects, is determined based on a number of the objects and a proportion of the captured real-world image occupied by object areas of the objects, the piece of information corresponding to each object being displayed in an area of the captured real-world image other than the object areas.

* * * * *